(12) United States Patent
Rahman et al.

(10) Patent No.: US 11,381,293 B2
(45) Date of Patent: Jul. 5, 2022

(54) METHOD AND APPARATUS TO ENABLE HIGH RANK CSI REPORTING IN WIRELESS COMMUNICATION SYSTEMS

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 16/838,906

(22) Filed: Apr. 2, 2020

(65) Prior Publication Data

US 2020/0343956 A1 Oct. 29, 2020

Related U.S. Application Data

(60) Provisional application No. 62/928,624, filed on Oct. 31, 2019, provisional application No. 62/851,406, (Continued)

(51) Int. Cl.
*H04B 7/06* (2006.01)
*H04B 7/0456* (2017.01)
*H04B 7/0417* (2017.01)

(52) U.S. Cl.
CPC ......... *H04B 7/0626* (2013.01); *H04B 7/0417* (2013.01); *H04B 7/0486* (2013.01); *H04B 7/0634* (2013.01)

(58) Field of Classification Search
CPC .................................................... H04B 7/0626
(Continued)

(56) References Cited

U.S. PATENT DOCUMENTS 10,868,603 B2 * 12/2020 Rahman ................ H04L 5/0094
2012/0033630 A1 * 2/2012 Chung .............. H04W 72/0453
370/329

(Continued)

FOREIGN PATENT DOCUMENTS

WO 2018097600 A1 5/2018
WO 2018201447 A1 11/2018

OTHER PUBLICATIONS

"3rd Generation Partnership Project; Technical Specification Group Radio Access Network; Evolved Universal Terrestrial Radio Access (E-UTRA); Physical channels and modulation (Release 15)", 3GPP TS 36.211 V15.5.0, Mar. 2019, 238 pages.

(Continued)

*Primary Examiner* — Lihong Yu

(57) ABSTRACT

A method for operating a user equipment (UE) comprises receiving, from a base station (BS), CSI feedback configuration information; determining, based on the CSI feedback configuration information, CSI feedback including, for each layer l of a total number of v layers, an indicator $i_{1,8,l}$ indicating an index of a strongest coefficient among $K_{NZ,l}$ coefficients, wherein $l \in \{1, \ldots, v\}$ is a layer index, $v \geq 1$ is a rank value, and $K_{NZ,l}$ is a number of non-zero coefficients for layer l; determining a payload of the indicator $i_{1,8,l}$ for each layer l based on the rank value; and transmitting, to the BS, over an uplink (UL) channel, the CSI feedback including the indicator $i_{1,8,l}$ each layer l of the total number of v layers.

20 Claims, 13 Drawing Sheets

Related U.S. Application Data filed on May 22, 2019, provisional application No. 62/850,088, filed on May 20, 2019, provisional application No. 62/848,968, filed on May 16, 2019, provisional application No. 62/845,001, filed on May 8, 2019, provisional application No. 62/840,009, filed on Apr. 29, 2019, provisional application No. 62/839,328, filed on Apr. 26, 2019.

(58) Field of Classification Search
 USPC ........................................................ 370/329
 See application file for complete search history.

(56) References Cited

U.S. PATENT DOCUMENTS

| 2018/0013471 | A1* | 1/2018 | Gao ........................ H04B 7/06 |
| 2018/0145737 | A1 | 5/2018 | Rahman et al. | |
| 2019/0123796 | A1 | 4/2019 | Jin et al. | |
| 2020/0059282 | A1* | 2/2020 | Wu ........................ H04W 72/04 |

OTHER PUBLICATIONS

"3rd Generation Partnership Project;Technical Specification Group Radio Access Network; Evolved Universal Terrestrial Radio Access (E-UTRA); Multiplexing and channel coding (Release 15)", 3GPP TS 36.212 V15.5.0, Mar. 2019, 246 pages.
"3rd Generation Partnership Project; Technical Specification Group Radio Access Network; Evolved Universal Terrestrial Radio Access (E-UTRA); Physical layer procedures (Release 15)", 3GPP TS 36.213 V15.5.0, Mar. 2019, 552 pages.
"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.5.0, Mar. 2019, 131 pages.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.5.0, Mar. 2019, 944 pages.
"3rd Generation Partnership Project;Technical Specification Group Services and System Aspects; Feasibility Study on Mew Services and Markets Technology Enablers; Stage 1 (Release 14)", 3GPP TR 22.891 V14.2.0, Sep. 2016, 95 pages.
"3rd Generation Partnership Project; Technical Specification Group Radio Access Network; NR; Multiplexing and channel coding (Release 15)", 3GPP TS 38.212 V15.5 0, Mar. 2019, 101 pages.
"3rd Generation Partnership Project; Technical Specification Group Radio Access Network; NR; Physical layer procedures for data (Release 15)", 3GPP TS 38.214 V15.5.0, Mar. 2019, 103 pages.
International Search Report of the International Searching Authority in connection with International Application No. PCT/KR2020/005314 dated Aug. 21, 2020, 3 pages.
Motorola Mobility et al., "On MU-MIMO CSI Enhancements," R1-1903381, 3GPP TSG RAN1 Meeting #96, Athens, Greece, Feb. 18-22, 2019, 21 pages.
Nokia et al., "Remaining details for Type I and Type II CSI reporting," R1-1800754, 3GPP TSG RAN WG1 Meeting AH 1801, Vancouver, Canada, Jan. 22-26, 2018, 6 pages.
Samsung, "On UCI design for DFT-based compression," R1-1904457, 3GPP TSG RAN WG1 Meeting #96bis, Xi'an, China, Apr. 8-12, 2019, 5 pages.
3GPP TS 38.214 V15.5.0 (Mar. 2019), Technical Specification, 3rd Generation Partnership Project, Technical Specification Group Radio Access Network, NR, Physical layer procedures for data, (Release 15) Mar. 27, 2019, 103 pages.
Extended European Search Report dated Feb. 14, 2022 regarding Application No. 20795731.7, 12 pages.
China National Intellectual Property Administration, First Office Action dated Apr. 2022 regarding Application No. 202080026665.3, 12 pages.
"Chairman's notes of AI 7.2.8 Enhancements on MIMO for NR", 3GPP TSG RAN WG1 Meeting #96bis, R1-1905803, Apr. 2019, 13 pages.
Nokia et al., "On UCI reporting of SCI and FD basis", 3GPP TSG RAN WG1 Meeting #96bis, R1-1905831, Apr. 2019, 2 pages.
"3rd Generation Partnership Project; Technical Specification Group Radio Access Network; NR; Physical layer procedures for data (Release 15)", 3GPP TS 38.214 V15.2.0, Jun. 2018, 95 pages.

\* cited by examiner

US 11,381,293 B2

METHOD AND APPARATUS TO ENABLE HIGH RANK CSI REPORTING IN WIRELESS COMMUNICATION SYSTEMS

CROSS-REFERENCE TO RELATED APPLICATIONS AND CLAIM OF PRIORITY

The present application claims priority to U.S. Provisional Patent Application No. 62/839,328 filed on Apr. 26, 2019, U.S. Provisional Patent Application No. 62/840,009, filed on Apr. 29, 2019, U.S. Provisional Patent Application No. 62/845,001, filed on May 8, 2019, U.S. Provisional Patent Application No. 62/848,968, filed on May 16, 2019, U.S. Provisional Patent Application No. 62/850,088, filed on May 20, 2019, U.S. Provisional Patent Application No. 62/851,406, filed on May 22, 2019, and U.S. Provisional Patent Application No. 62/928,624, filed on Oct. 31, 2019. The content of the above-identified patent documents is incorporated herein by reference.

TECHNICAL FIELD

The present disclosure relates generally to wireless communication systems and more specifically to channel state information (CSI) reporting in wireless communication systems.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses to enable channel state information (CSI) reporting in a wireless communication system.

In one embodiment, a UE for CSI reporting in a wireless communication system is provided. The UE includes a transceiver configured to receive, from a base station (BS), CSI feedback configuration information. The UE further includes a processor operably connected to the transceiver. The processor is configured to: determine, based on the CSI feedback configuration information, the CSI feedback including, for each layer l of a total number of v layers, an indicator $i_{1,8,l}$ indicating an index of a strongest coefficient among $K_{NZ,l}$ coefficients, wherein $l \in \{1, \ldots, v\}$ is a layer index, $v \geq 1$ is a rank value, and $K_{NZ,l}$ is a number of non-zero coefficients for layer l; and determine a payload of the indicator $i_{1,8,l}$ for each layer l based on the rank value. The transceiver is further configured to transmit, to the BS, over an uplink (UL) channel, the CSI feedback including the indicator $i_{1,8,l}$ for each layer l of the total number of v layers.

In another embodiment, a BS in a wireless communication system is provided. The BS includes a transceiver configured to: transmit channel state information (CSI) feedback configuration information to a user equipment (UE); and receive, from the UE, CSI feedback including an indicator $i_{1,8,l}$ indicating an index of a strongest coefficient among $K_{NZ,l}$ coefficients for each layer l of a total number of v layers, wherein $l \in \{1, \ldots, v\}$ is a layer index, $v \geq 1$ is a rank value, $K_{NZ,l}$ is a number of non-zero coefficients for layer l, and a payload of the indicator $i_{1,8,l}$ for each layer l is based on the rank value. The BS further includes a processor operably coupled to the transceiver. The processor is configured to: generate the CSI feedback configuration information; and use the indicator $i_{1,8,l}$ to obtain the strongest coefficient among the $K_{NZ,l}$ coefficients for each layer l of the total number of v layers.

In yet another embodiment, a method for operating a UE is provided. The method comprises: receiving, from a base station (BS), channel state information (CSI) feedback configuration information; determining, based on the CSI feedback configuration information, CSI feedback including, for each layer l of a total number of v layers, an indicator $i_{1,8,l}$ indicating an index of a strongest coefficient among $K_{NZ,l}$ coefficients, wherein $l \in \{1, \ldots, v\}$ is a layer index, $v \geq 1$ is a rank value, and $K_{NZ,l}$ is a number of non-zero coefficients for layer l; determining a payload of the indicator $i_{1,8,l}$ for each layer l based on the rank value; and transmitting, to the BS, over an uplink (UL) channel, the CSI feedback including the indicator $i_{1,8,l}$ for each layer l of the total number of v layers.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
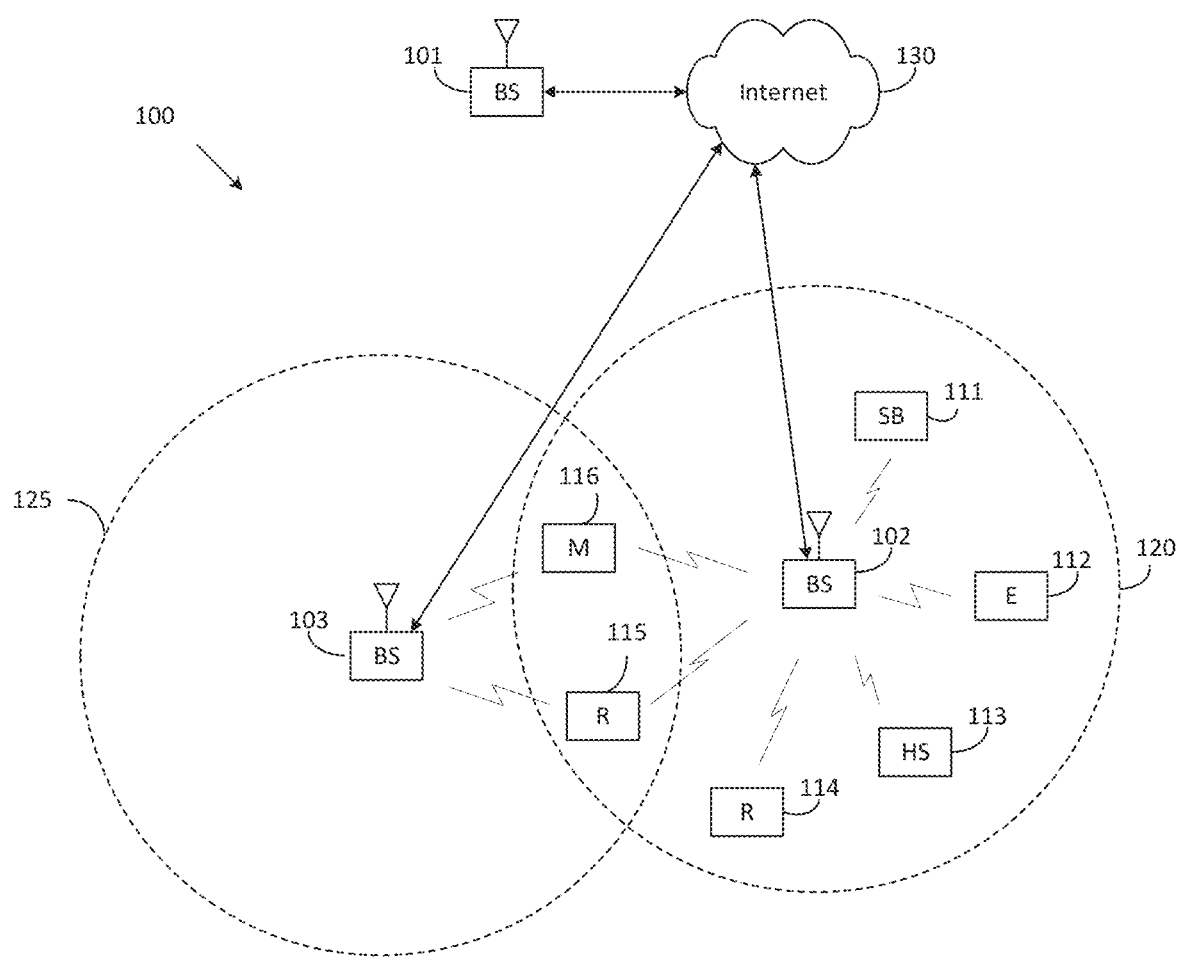
FIG. 1 illustrates an example wireless network according to embodiments of the present disclosure.

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.0.0, "E-UTRA, Physical channels and modulation;" 3GPP TS 36.212 v16.0.0, "E-UTRA, Multiplexing and Channel coding;" 3GPP TS 36.213 v16.0.0, "E-UTRA, Physical Layer Procedures;" 3GPP TS 36.321 v16.0.0, "E-UTRA, Medium Access Control (MAC) protocol specification;" 3GPP TS 36.331 v16.0.0, "E-UTRA, Radio Resource Control (RRC) protocol specification;" 3GPP TR 22.891 v14.2.0; 3GPP TS 38.211 v16.0.0, "E-UTRA, NR, Physical channels and modulation;" 3GPP TS 38.213 v16.0.0, "E-UTRA, NR, Physical Layer Procedures for control;" 3GPP TS 38.214 v16.0.0, "E-UTRA, NR, Physical layer procedures for data;" and 3GPP TS 38.212 v16.0.0, "E-UTRA, NR, Multiplexing and channel coding."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
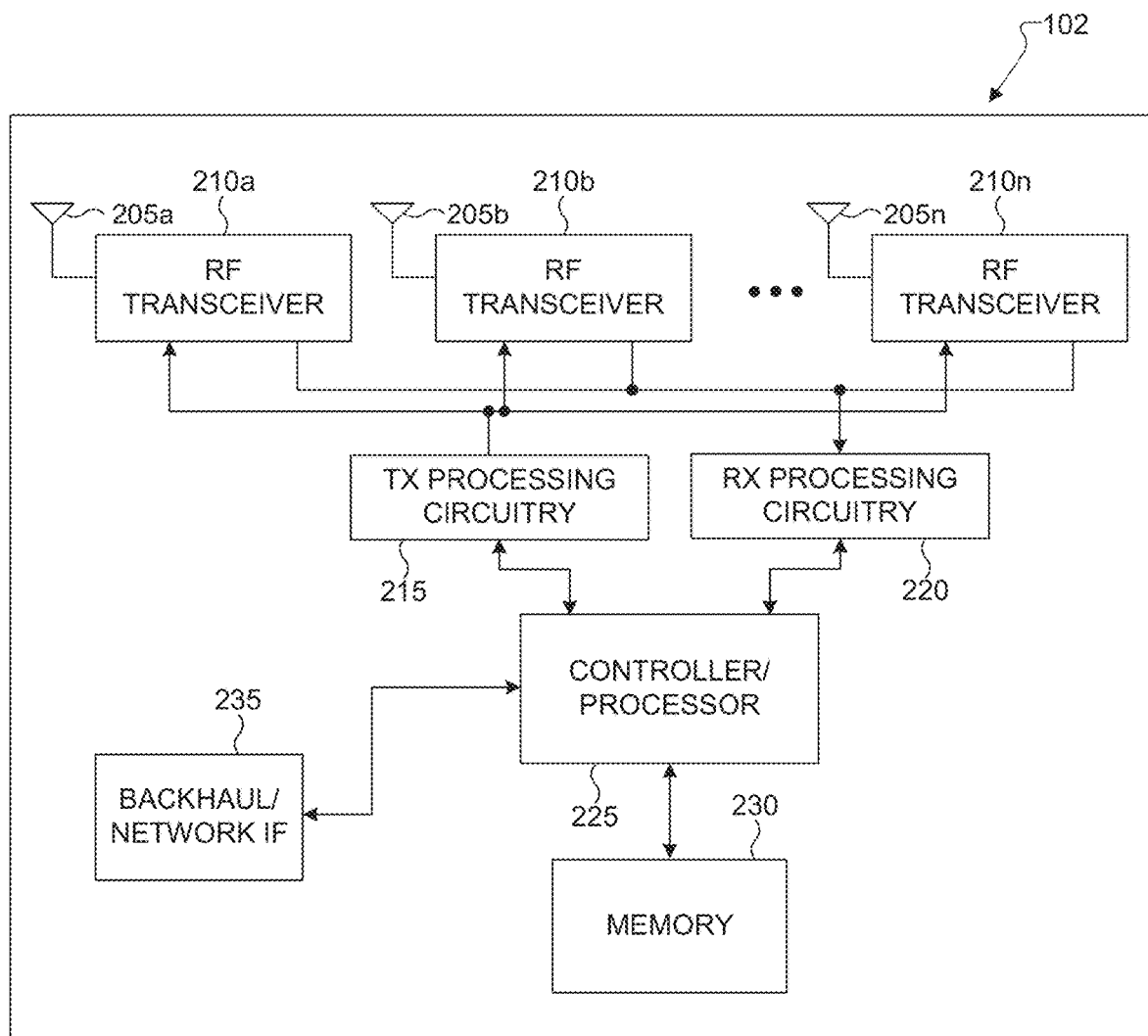
FIG. 2 illustrates an example gNB according to embodiments of the present disclosure.
Figure 3:
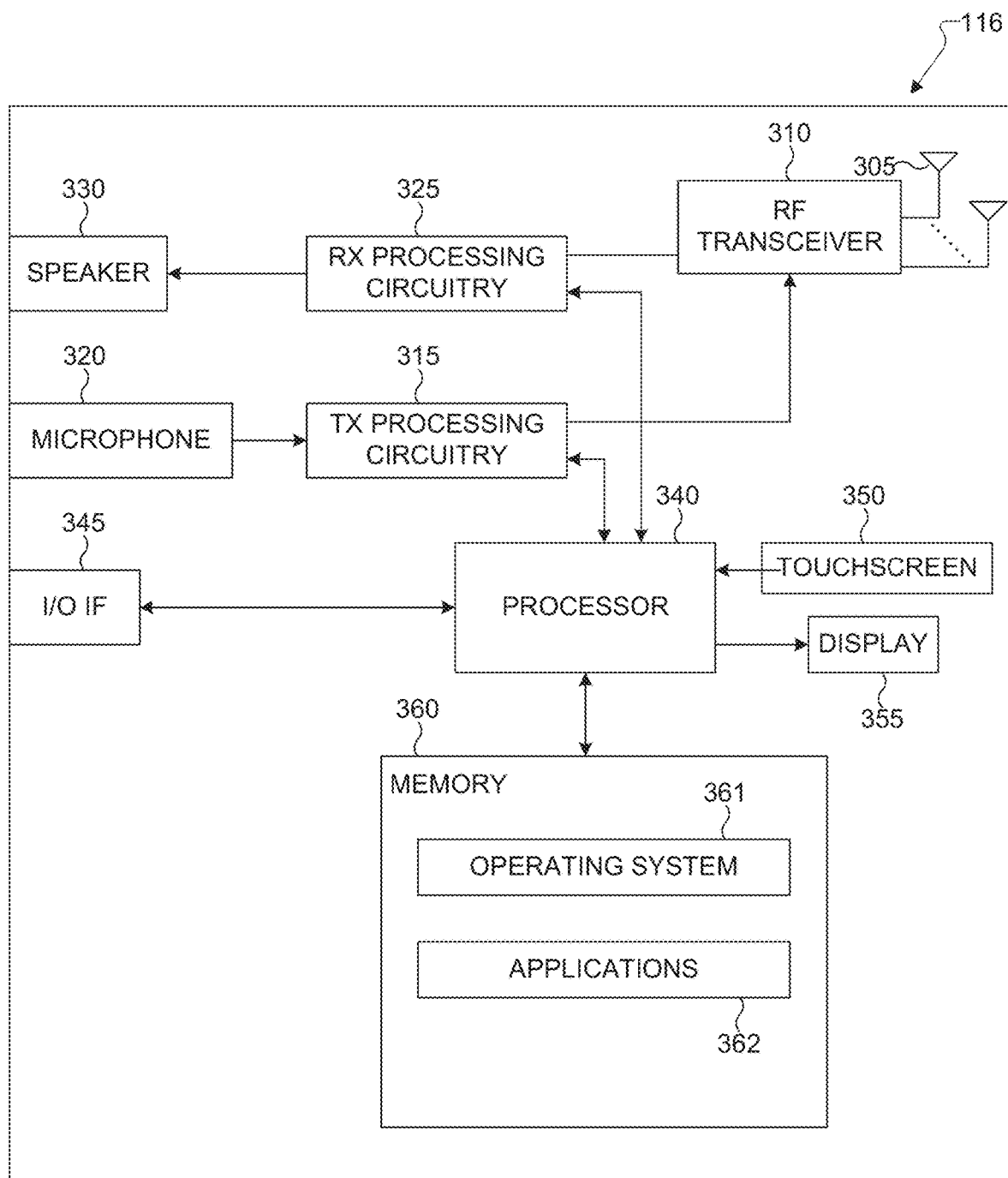
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for utilizing a codebook subset restriction for CSI reporting for communications in a wireless communication system. In certain embodiments, and one or more of the gNBs 101-103 includes circuitry, programing, or a combination thereof, for CSI acquisition in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI feedback on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
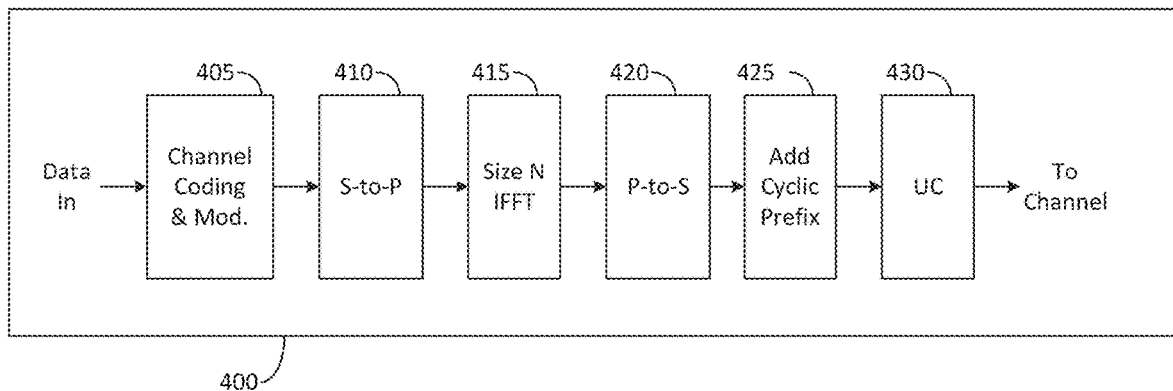
FIG. 4A illustrates a high-level diagram of an orthogonal frequency division multiple access transmit path according to embodiments of the present disclosure.
Figure 4B:
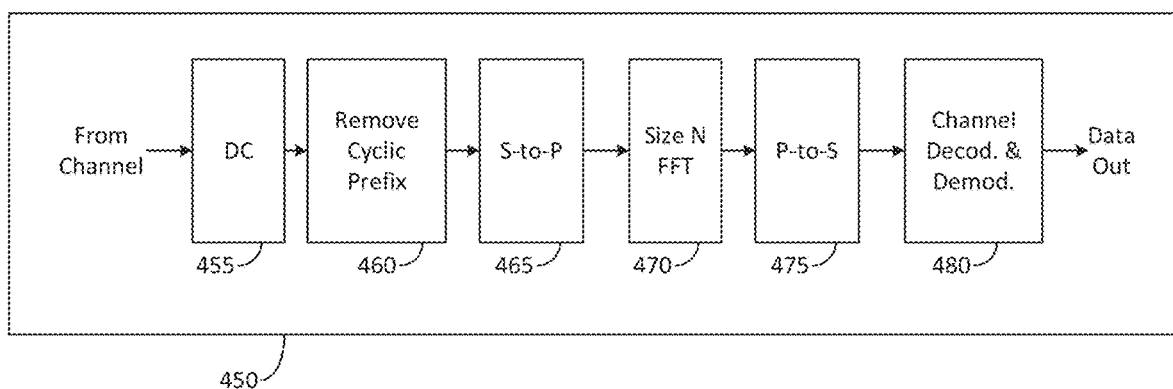
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460, and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
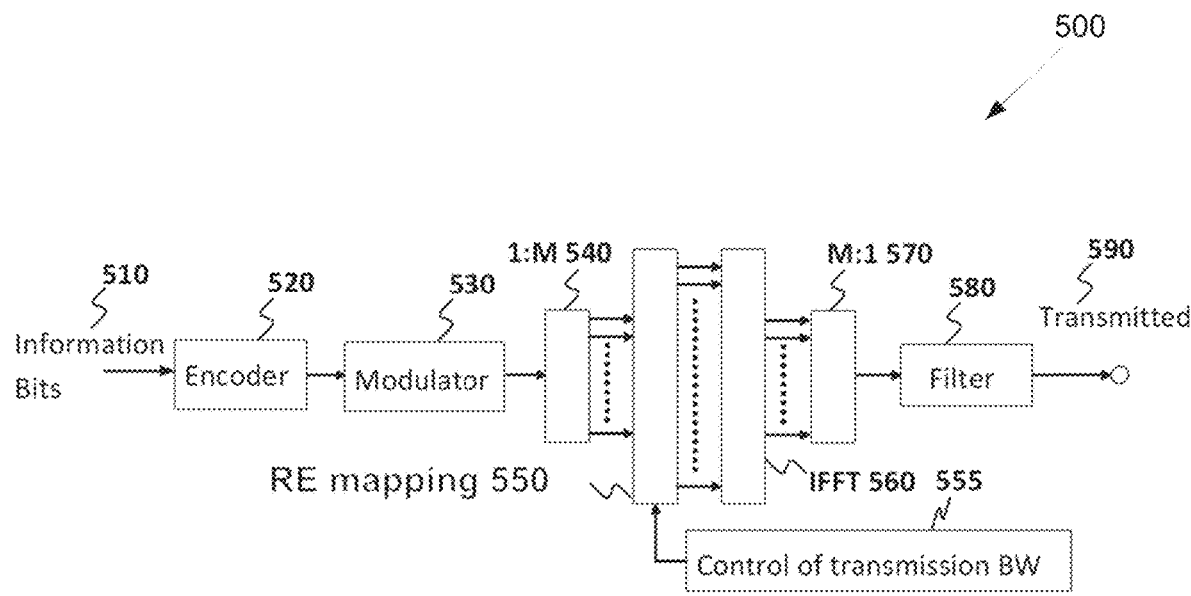
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
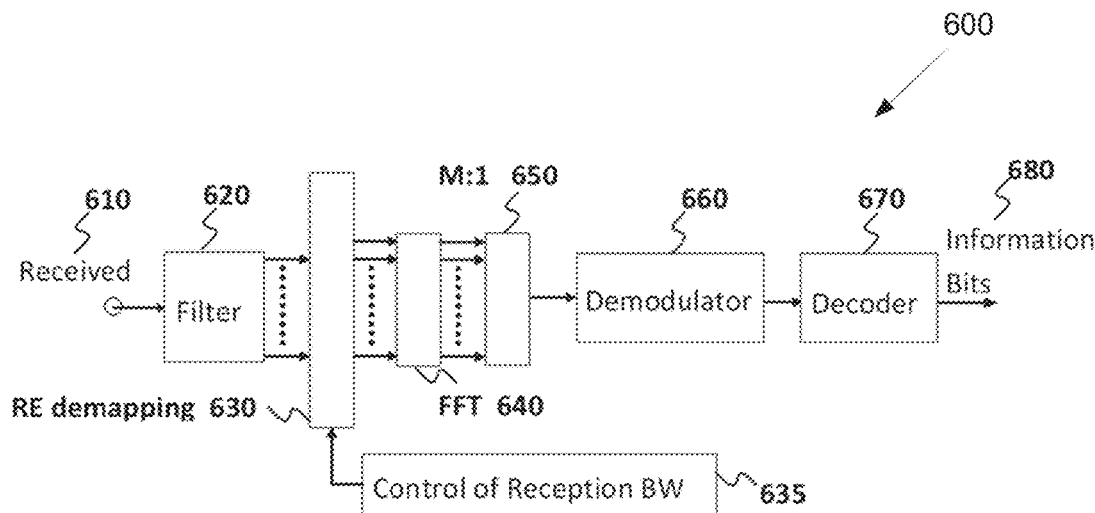
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
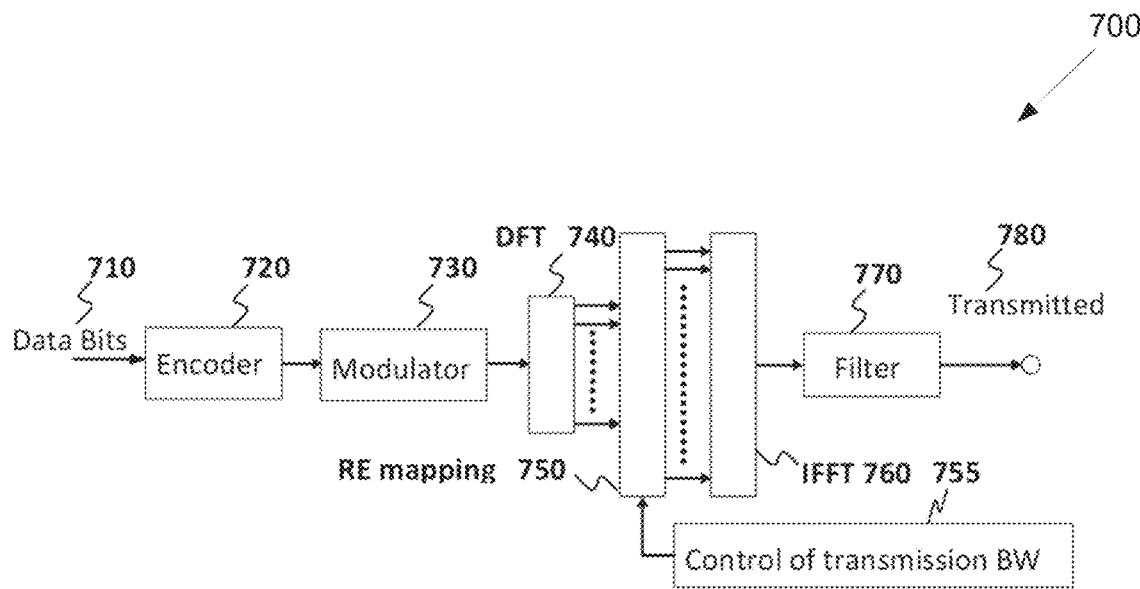
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
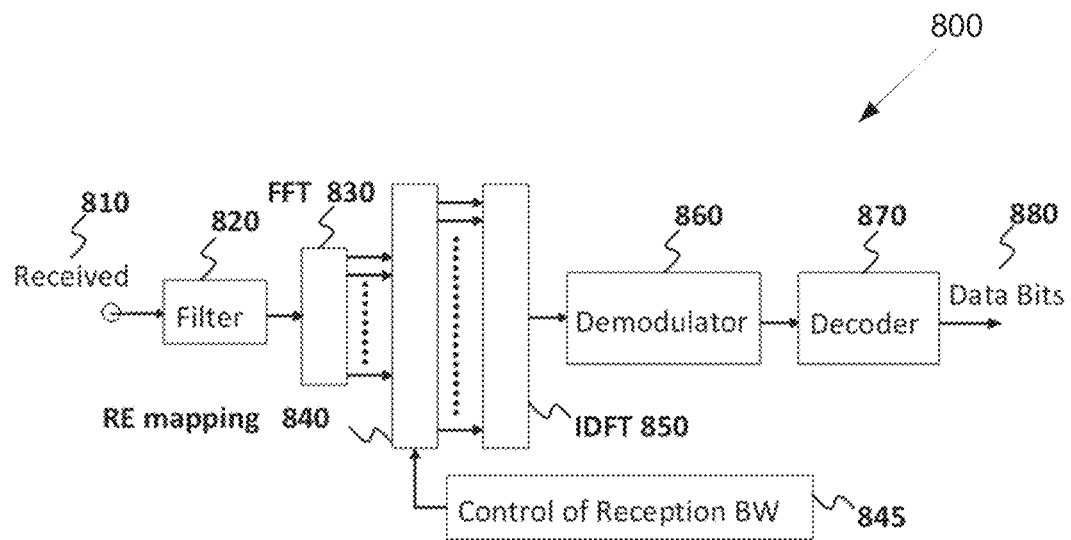
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

Figure 9:
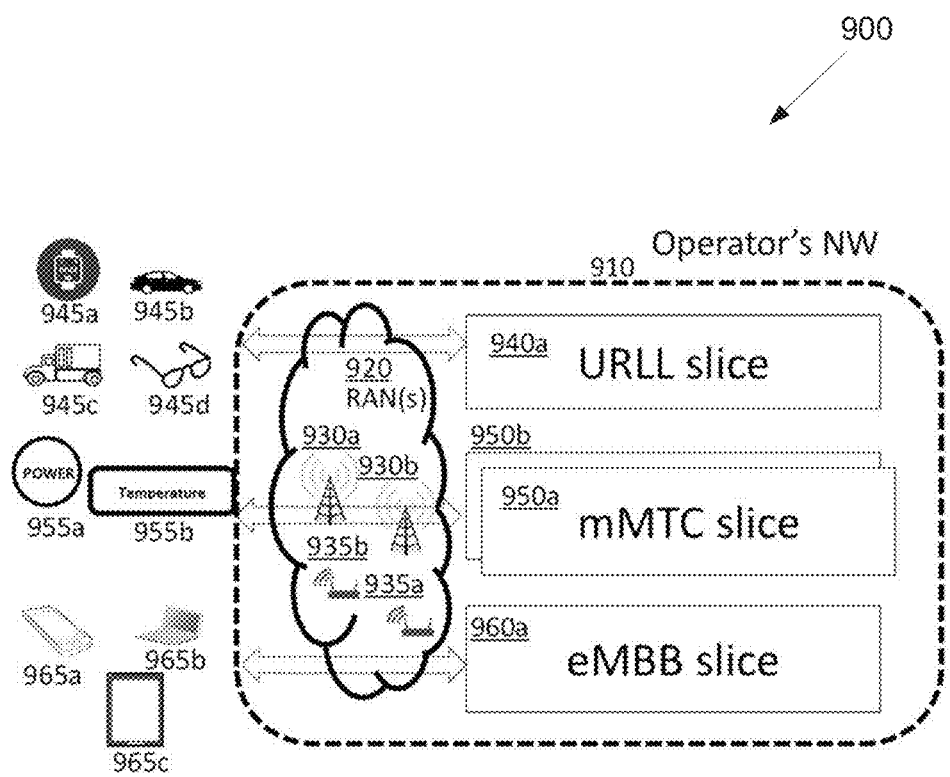
FIG. 9 illustrates an example network configuration according to embodiments of the present disclosure.

FIG. 9 illustrates an example network configuration 900 according to embodiments of the present disclosure. The embodiment of the network configuration 900 illustrated in FIG. 9 is for illustration only. FIG. 9 does not limit the scope of this disclosure to any particular implementation of the configuration 900.

In order for the 5G network to support such diverse services with different quality of services (QoS), one scheme has been identified in 3GPP specification, called network slicing.

As shown in FIG. 9, an operator's network 910 includes a number of radio access network(s) 920 (RAN(s)) that are associated with network devices such as gNBs 930a and 930b, small cell base stations (femto/pico gNBs or Wi-Fi access points) 935a and 935b. The network 910 can support various services, each represented as a slice.

In the example, an URLL slice 940a serves UEs requiring URLL services such as cars 945b, trucks 945c, smart watches 945a, and smart glasses 945d. Two mMTC slices 950a and 950b serve UEs requiring mMTC services such as power meters 955a, and temperature control box 955b. One eMBB slice 960a serves UEs requiring eMBB services such as cells phones 965a, laptops 965b, and tablets 965c. A device configured with two slices can also be envisioned.

To utilize PHY resources efficiently and multiplex various slices (with different resource allocation schemes, numerologies, and scheduling strategies) in DL-SCH, a flexible and self-contained frame or subframe design is utilized.

Figure 10:
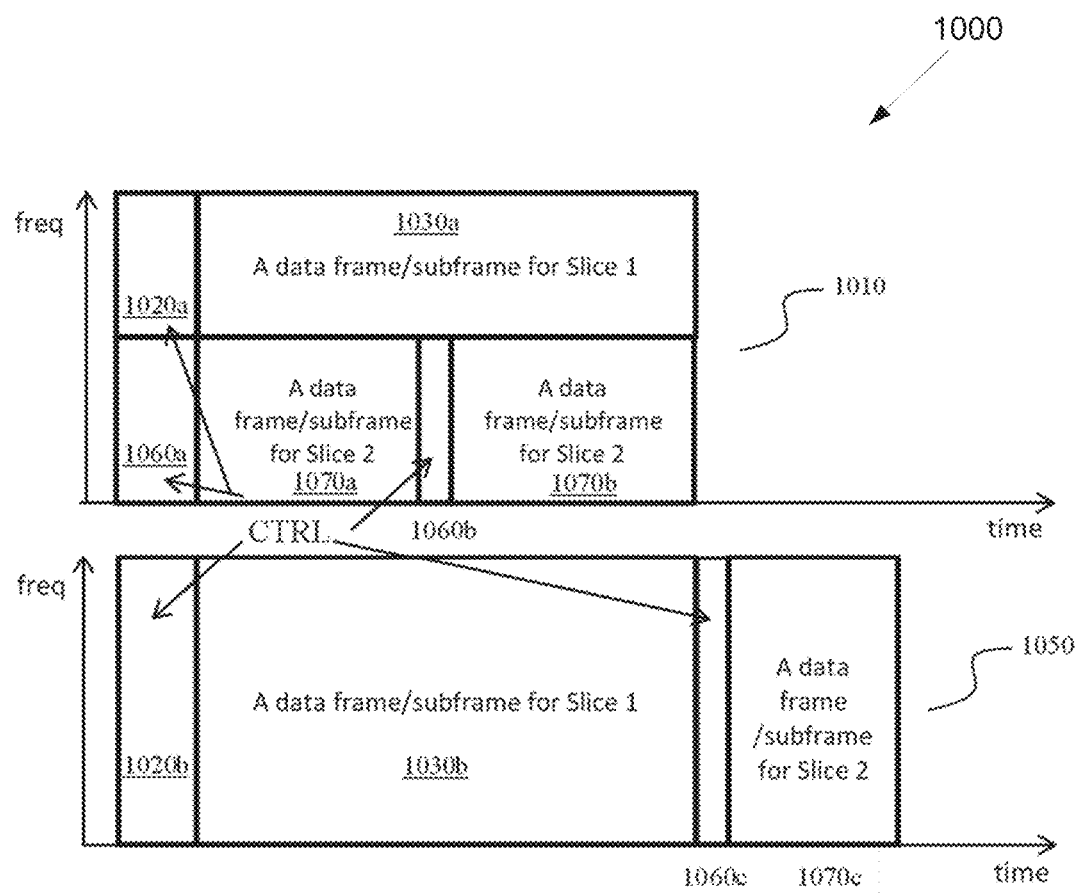
FIG. 10 illustrates an example multiplexing of two slices according to embodiments of the present disclosure.

FIG. 10 illustrates an example multiplexing of two slices 1000 according to embodiments of the present disclosure. The embodiment of the multiplexing of two slices 1000 illustrated in FIG. 10 is for illustration only. One or more of the components illustrated in FIG. 10 can be implemented in specialized circuitry configured to perform the noted functions or one or more of the components can be implemented by one or more processors executing instructions to perform the noted functions. FIG. 10 does not limit the scope of this disclosure to any particular implementation of the multiplexing of two slices 1000.

Two exemplary instances of multiplexing two slices within a common subframe or frame are depicted in FIG. 10. In these exemplary embodiments, a slice can be composed of one or two transmission instances where one transmission instance includes a control (CTRL) component (e.g., 1020a, 1060a, 1060b, 1020b, or 1060c) and a data component (e.g., 1030a, 1070a, 1070b, 1030b, or 1070c). In embodiment 1010, the two slices are multiplexed in frequency domain whereas in embodiment 1050, the two slices are multiplexed in time domain.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 11:
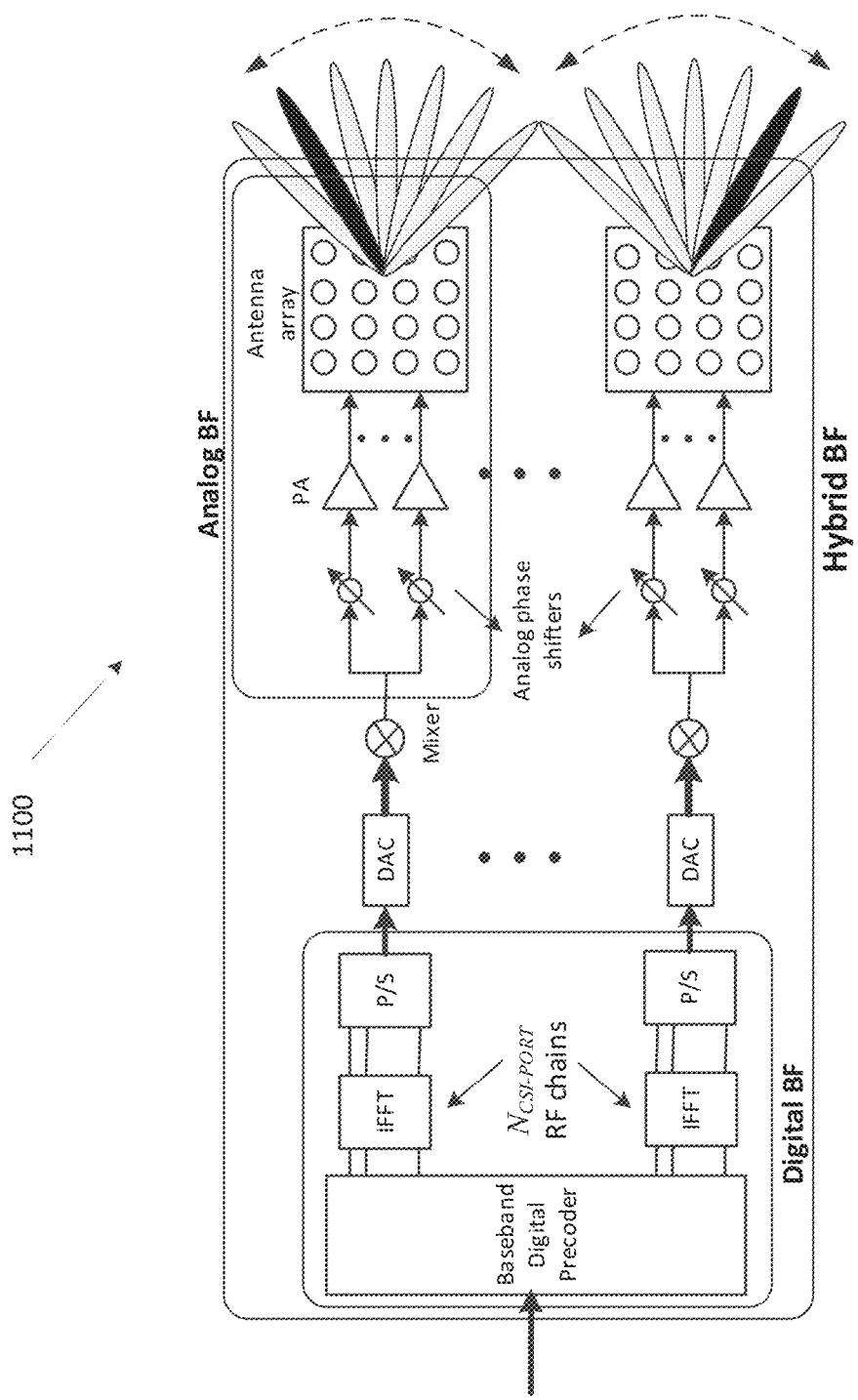
FIG. 11 illustrates an example antenna blocks according to embodiments of the present disclosure.

FIG. 11 illustrates an example antenna blocks 1100 according to embodiments of the present disclosure. The embodiment of the antenna blocks 1100 illustrated in FIG. 11 is for illustration only. FIG. 11 does not limit the scope of this disclosure to any particular implementation of the antenna blocks 1100.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 11. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports NCSI-PORT. A digital beamforming unit performs a linear combination across NCSI-PORT analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanism corresponding to three types of CSI-RS measurement behavior are supported, for example, "CLASS A" CSI reporting which corresponds to non-precoded CSI-RS, "CLASS B" reporting with K=1 CSI-RS resource which corresponds to UE-specific beamformed CSI-RS, and "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (e.g., comprising multiple ports). At least at a given time/frequency, CSI-RS ports have narrow beam widths and hence not cell wide coverage, and at least from the gNB perspective. At least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In the 3GPP LTE specification, MIMO has been identified as an essential feature in order to achieve high system throughput requirements and it will continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, the CSI can be acquired using the CSI-RS transmission from the eNB, and CSI acquisition and feedback from the UE. In legacy FDD systems, the CSI feedback framework is 'implicit' in the form of CQI/PMI/RI derived from a codebook assuming SU transmission from the eNB. Because of the inherent SU assumption while deriving CSI, this implicit CSI feedback is inadequate for MU transmission. Since future (e.g., NR) systems are likely to be more MU-centric, this SU-MU CSI mismatch will be a bottleneck in achieving high MU performance gains. Another issue with implicit feedback is the scalability with larger number of antenna ports at the eNB. For large number of antenna ports, the codebook design for implicit feedback is quite complicated, and the designed codebook is not guaranteed to bring justifiable performance benefits in practical deployment scenarios (for example, only a small percentage gain can be shown at the most).

In 5G or NR systems, the above-mentioned CSI reporting paradigm from LTE is also supported and referred to as Type I CSI reporting. In addition to Type I, a high-resolution CSI reporting, referred to as Type II CSI reporting, is also supported to provide more accurate CSI information to gNB for use cases such as high-order MU-MIMO.

Figure 12:
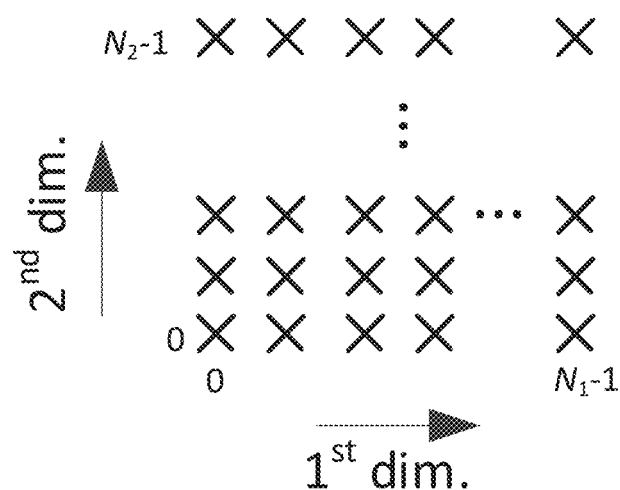
FIG. 12 illustrates an antenna port layout according to embodiments of the present disclosure.

FIG. 12 illustrates an example antenna port layout 1200 according to embodiments of the present disclosure. The embodiment of the antenna port layout 1200 illustrated in FIG. 12 is for illustration only. FIG. 12 does not limit the scope of this disclosure to any particular implementation of the antenna port layout 1200.

As illustrated in FIG. 12, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. Therefore, for a dual-polarized antenna port layout, the total number of antenna ports is $2N_1N_2$.

As described in U.S. patent application Ser. No. 15/490,561, filed Apr. 18, 2017 and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination based Type II CSI reporting framework is extended to include a frequency dimension in addition to the first and second antenna port dimensions.

Figure 13:
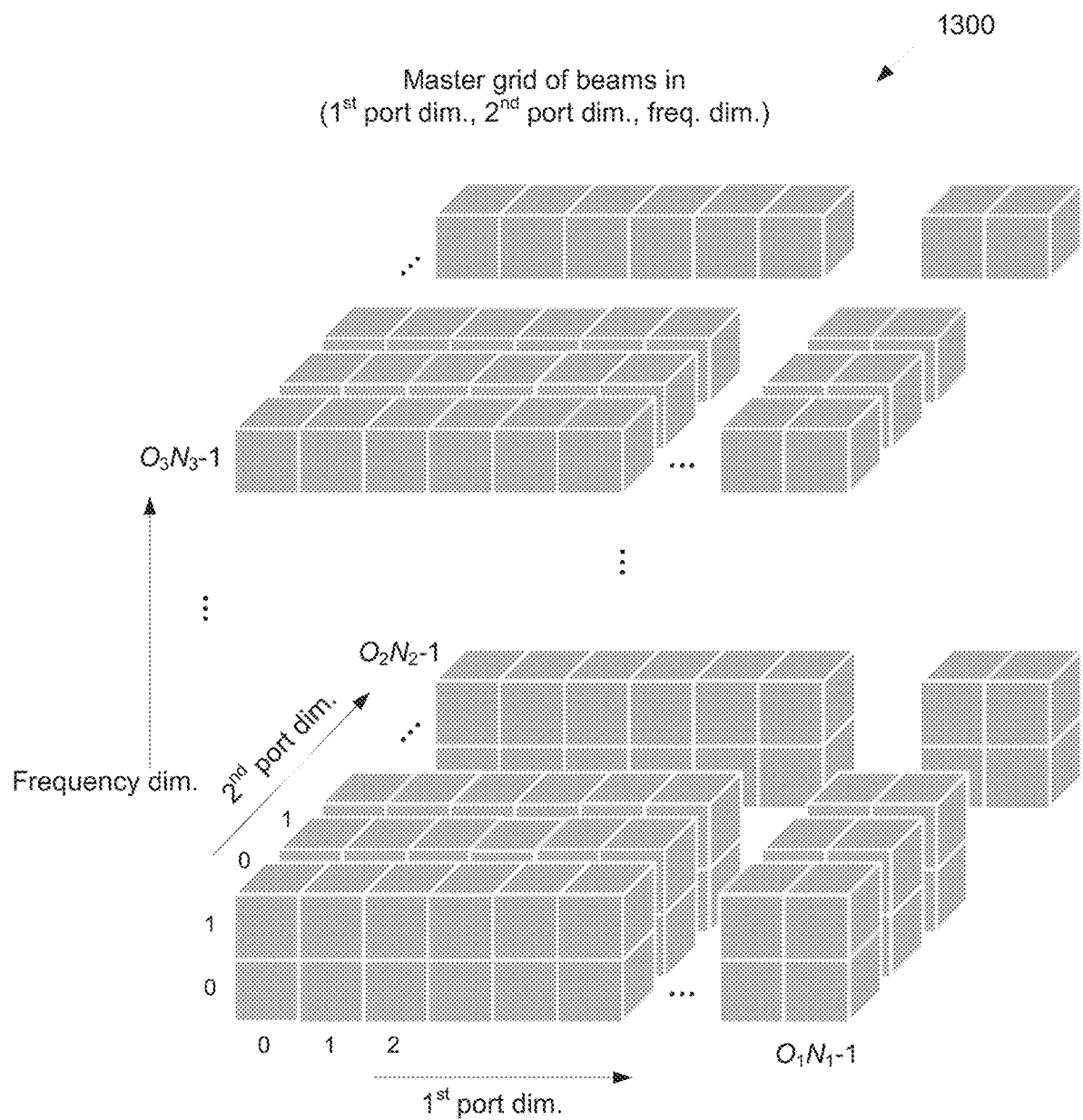
FIG. 13 illustrates a 3D grid of oversampled DFT beams according to embodiments of the present disclosure.

FIG. 13 illustrates a 3D grid 1300 of the oversampled DFT beams (1st port dim., 2nd port dim., freq. dim.) in which 1st dimension is associated with the 1st port dimension, 2nd dimension is associated with the 2nd port dimension, and 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In another example, the oversampling factors $O_1$ belongs to $\{2, 4, 8\}$. In yet another example, at least one of $O_1$, $O_2$, and $O_3$ is higher layer configured (via RRC signaling).

A UE is configured with higher layer parameter CodebookType set to 'TypeII-Compression' or 'TypeIII' for an enhanced Type II CSI reporting in which the pre-coders for all subbands (SBs) and for a given layer l=1, . . . , v, where v is the associated RI value, is given by either $$W^l = AC_l B^H = [a_0 a_1 \ldots a_{L-1}] \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} \quad \text{(Eq. 1)}$$

$$[b_0 b_1 \ldots b_{M-1}]^H =$$

$$\sum_{m=0}^{M-1}\sum_{i=0}^{L-1} c_{l,i,m}(a_i b_m^H) = \sum_{i=0}^{L-1}\sum_{m=0}^{M-1} c_{l,i,m}(a_i b_m^H), \text{ or}$$

-continued $$W^l = \begin{bmatrix} A & 0 \\ 0 & A \end{bmatrix} C_l B^H = \begin{bmatrix} a_0 a_1 \ldots a_{L-1} & 0 \\ 0 & a_0 a_1 \ldots a_{L-1} \end{bmatrix} \quad \text{(Eq. 2)}$$

$$\begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 b_1 \ldots b_{M-1}]^H =$$

$$\begin{bmatrix} \sum_{m=0}^{M-1} \sum_{i=0}^{L-1} c_{l,i,m}(a_i b_m^H) \\ \sum_{m=0}^{M-1} \sum_{i=0}^{L-1} c_{l,i+L,m}(a_i b_m^H) \end{bmatrix},$$

where $N_1$ is a number of antenna ports in a first antenna port dimension, $N_2$ is a number of antenna ports in a second antenna port dimension, $N_3$ is a number of SBs or frequency domain (FD) units/components for PMI reporting (that comprise the CSI reporting band), which can be different (e.g., less than) from a number of SBs for CQI reporting, $a_i$ is a $2N_1N_2 \times 1$ (Eq. 1) or $N_1N_2 \times 1$ (Eq. 2) column vector, $b_m$ is a $N_3 \times 1$ column vector, $c_{l,i,m}$ is a complex coefficient.

In a variation, when a subset K<2LM coefficients (where K is either fixed, configured by the gNB or reported by the UE), then the coefficient in precoder equations Eq. 1 or Eq. 2 is replaced with $v_{l,i,m} \times c_{l,i,m}$ where $v_{l,i,m} = 1$ if the coefficient is non-zero, hence reported by the UE according to some embodiments of this disclosure.

$v_{l,i,m} = 0$ otherwise (i.e., is zero, hence not reported by the UE).

The indication whether $v_{l,i,m} = 1$ or 0 is according to some embodiments of this disclosure.

In a variation, the precoder equations Eq. 1 or Eq. 2 are respectively generalized to $$W^l = \sum_{i=0}^{L-1} \sum_{m=0}^{M_i-1} c_{l,i,m}(a_i b_{i,m}^H) \quad \text{(Eq. 3)}$$

$$W^l = \begin{bmatrix} \sum_{m=0}^{L-1} \sum_{m=0}^{M-1} c_{l,i,m}(a_i b_m^H) \\ \sum_{i=0}^{L-1} \sum_{m=0}^{M_i-1} c_{l,i+L,m}(a_i b_m^H) \end{bmatrix}, \quad \text{(Eq. 4)}$$

where for a given i, the number of basis vectors is $M_i$ and the corresponding basis vectors are Note that $M_i$ is the number of coefficients reported by the UE for a given i, where $M_i \le M$ (where $\{M_i\}$ or $\Sigma M_i$ is either fixed, configured by the gNB or reported by the UE).

The columns of $W^l$ are normalized to norm one. For rank R or R layers (v=R), the pre-coding matrix is given by $$W^{(R)} = \frac{1}{\sqrt{R}} [W^1 \ W^2 \ \ldots \ W^R].$$

Eq. 2 is assumed in the rest of the disclosure. The embodiments of the disclosure, however, are general and are also applicable to Eq. 1, Eq. 3 and Eq. 4.

$L \le 2N_1N_2$ and $K \le N_3$. If $L = 2N_1N_2$, then A is an identity matrix, and hence not reported. Likewise, if $K = N_3$, then B is an identity matrix, and hence not reported. Assuming $L < 2N_1N_2$, in an example, to report columns of A, the oversampled DFT codebook is used. For instance, $a_i = v_{l,m}$, where the quantity $v_{l,m}$ is given by:

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}.$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

Similarly, assuming $K < N_3$, in an example, to report columns of B, the oversampled DFT codebook is used. For instance, $b_k = w_k$, where the quantity $w_k$ is given by:

$$w_k = \begin{bmatrix} 1 & e^{j\frac{2\pi k}{O_3 N_3}} & \ldots & e^{j\frac{2\pi k(N_3-1)}{O_3 N_3}} \end{bmatrix}.$$

In another example, discrete cosine transform DCT basis is used to construct/report basis B for the $3^{rd}$ dimension. The m-th column of the DCT compression matrix is simply given by $$[W_f]_{nm} = \begin{cases} \frac{1}{\sqrt{K}}, & n = 0 \\ \sqrt{\frac{2}{K}} \cos\frac{\pi(2m+1)n}{2K}, & n = 1, \ldots K-1 \end{cases}, \text{ and}$$

$K = N_3$, and $m = 0, \ldots, N_3 - 1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

Also, in an alternative, for reciprocity-based Type II CSI reporting, a UE is configured with higher layer parameter CodebookType set to 'TypeII-PortSelection-Compression' or 'TypeIII-PortSelection' for an enhanced Type II CSI reporting with port selection in which the pre-coders for all SBs and for a given layer $l = 1, \ldots, v$, where v is the associated RI value, is given by $W^l = AC_l B^H$, where $N_1$, $N_2$, $N_3$, and $c_{l,j,k}$ are defined as above except that the matrix A comprises port selection vectors. For instance, the L antenna ports per polarization or column vectors of A are selected by the index $q_1$, where $$q_1 \in \left\{ 0, 1, \ldots, \left\lceil \frac{P_{CSI-RS}}{2d} \right\rceil - 1 \right\}$$

(this requires $$\left\lceil \log_2 \left\lceil \frac{P_{CSI-RS}}{2d} \right\rceil \right\rceil \text{bits} \Big),$$

and the value of d is configured with the higher layer parameter PortSelectionSamplingSize, where $d \in \{1, 2, 3, 4\}$ and $$d \leq \min\left(\frac{P_{CSI-RS}}{2}, L\right).$$

To report columns of A, the port selection vectors are used, For instance, $a_i = v_m$, where the quantity $v_m$ is a $P_{CSI-RS}/2$-element column vector containing a value of 1 in element (m mod $P_{CSI-RS}/2$) and zeros elsewhere (where the first element is element 0).

On a high level, a precoder $W^l$ can be described as follows.

$$W^l = AC_l B^H = W_1 \tilde{W}_2 W_f^H, \quad (5)$$

where $A = W_1$ corresponds to the $W_1$ in Type II CSI codebook, i.e., $$W_1 = \begin{bmatrix} A & 0 \\ 0 & A \end{bmatrix}$$

and $B = W_f$. The $C = \tilde{W}_2$ matrix consists of all the required linear combination coefficients (e.g., amplitude and phase or real or imaginary). Each reported coefficient ($c_{l,i,m} = p_{l,i,m} \phi_{l,i,m}$) in $\tilde{W}_2$ is quantized as amplitude coefficient ($p_{l,i,m}$) and phase coefficient ($\phi_{l,i,m}$).

In one example, the amplitude coefficient ($p_{l,i,m}$) is reported using an A-bit amplitude codebook where A belongs to $\{2, 3, 4\}$. If multiple values for A are supported, then one value is configured via higher layer signaling. In another example, the amplitude coefficient ($p_{l,i,m}$) is reported as $p_{l,i,m} = p_{l,i,m}^{(1)} p_{l,i,m}^{(2)}$ where:

$p_{l,i,m}^{(1)}$ is a reference or first amplitude which is reported using a A1-bit amplitude codebook where A1 belongs to $\{2, 3, 4\}$, and $p_{l,i,m}^{(2)}$ is a differential or second amplitude which is reported using a A2-bit amplitude codebook where A2 ≤ A1 belongs to $\{2, 3, 4\}$.

For layer 1, let us denote the linear combination (LC) coefficient associated with spatial domain (SD) basis vector (or beam) $i \in \{0, 1, \ldots, 2L_l - 1\}$ and frequency domain (FD) basis vector (or beam) $m \in \{0, 1, \ldots, M_l - 1\}$ as and the strongest coefficient as Here, $(L_l, M_l)$ denotes the number of SD and FD basis vectors for layer l. In one example, $L_l = L$. The strongest coefficient is reported out of the $K_{NZ,l}$ non-zero (NZ) coefficients that are reported using a bitmap of length $2L_l M_l$, where $K_{NZ,l} < K_{0,l} = \lceil \beta_l \times 2L_l M_l \rceil < 2L_l M_l$ and $\beta_l$ is higher layer configured. In one example, $\beta_l = \beta$ for rank 1-2. In one example, $\beta_l$ for rank >2 is either fixed (based on β for rank 1-2) or higher layer configured. The remaining $2L_l M_l - K_{NZ,l}$ coefficients that are not reported by the UE are assumed to be zero.

In one example, the following quantization scheme is used to quantize/report the $K_{NZ,l}$ NZ coefficients for each layer l. UE reports the following for the quantization of the NZ coefficients in $\tilde{W}_2$:

A $X_l$-bit strongest coefficient indicator ($SCI_l$) for the strongest coefficient index (i*,m*)

Strongest coefficient $c_{l,i^*,m^*} = 1$ (hence its amplitude/phase are not reported)

Two antenna polarization-specific reference amplitudes:

For the polarization associated with the strongest coefficient $c_{l,i^*,m^*} = 1$, since the reference amplitude $p_{l,i,m}^{(1)} = 1$, it is not reported.

For the other polarization, reference amplitude $p_{l,i,m}^{(1)}$ is quantized to 4 bits The 4-bit amplitude alphabet is $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}},$$

"reserved"}.

For $\{c_{l,i,m}, (i,m) \neq (i^*,m^*)\}$:

For each polarization, differential amplitudes $p_{l,i,m}^{(2)}$ of the coefficients calculated relative to the associated polarization-specific reference amplitude and quantized to 3 bits.

The 3-bit amplitude alphabet is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

Note: The final quantized amplitude $p_{l,i,m}$ is given by $p_{l,i,m}^{(1)} \times p_{l,i,m}^{(2)}$.

Each phase is quantized to either 8PSK (3-bit) or 16PSK (4-bit) (which is configurable).

Several alternatives are proposed for per layer $SCI_l$ reporting for rank ≥1, where rank corresponds to a number of layers v (or RI value) that the reported CSI corresponds to. In this disclosure, v layers are indexed as $l = 0, 1, 2, \ldots, v-1$.

It is assumed that either per-layer $K_{NZ,l}$ or their sum $K_{NZ} = \Sigma_{l=0}^{v-1} K_{NZ,l}$ is reported via part 1 of a two-part UCI comprising UCI part 1 and UCI part 2.

Further, several embodiments about reporting M' ≤ M FD basis vectors are considered. Since the UE reports M' basis vectors, the bitmap to report the indices of NZ coefficients is assumed to be of size 2LM'.

In embodiment 0, for all rank or v value, a UE is configured to report $SCI_l$ for each layer $l \in \{0, 1, \ldots, v-1\}$ or $\{1, \ldots, v\}$ independently (e.g. via part 2 of UCI part 2) according to at least one of the following alternatives.

In one alternative Alt0-0: $SCI_l$ is a $\lceil \log_2 K_{NZ,l} \rceil$-bit indicator.

In one alternative Alt0-1: $SCI_l$ is a $\lceil \log_2 \min\{\Sigma_{l=0}^{v-1} K_{NZ,l}, 2L_l M_l\} \rceil$-bit indicator.

In one alternative Alt0-2: $SCI_l$ is a $\lceil \log_2 2K_0 \rceil$ indicator.

In one alternative Alt0-3: $SCI_l$ is a $\lceil \log_2 K_0 \rceil$-bit indicator.

In one alternative Alt0-4: $SCI_l$ is a $\lceil \log_2 2L \rceil$-bit.

In one alternative Alt0-5: $SCI_l$ is a $\lceil \log_2 2LM_l \rceil$-bit indicator.

In one example, only one of these alternatives is supported, e.g., Alt 0-0 or Alt 0-3 or Alt 0-4. In another example, more than one (e.g., Alt 0-0 and Alt 0-3 or Alt 0-0 and Alt 0-4) of these alternatives are supported. If more than one of the alternatives is supported, then one of them is configured (e.g., via higher layer or MAC CE based or DCI based signaling). In another example, two of these alternatives are supported, and the UE uses one of the two supported alternatives to report $SCI_l$ based on a fixed condition. For example, the supported alternatives are Alt0-3 and Alt0-4, the fixed condition is according to at least one of the following examples.

In one example Ex0-0: The UE uses Alt0-4 if $\lceil \log_2 K_0 \rceil \geq \lceil \log_2 2L \rceil$, and uses Alt0-3 otherwise ($\lceil \log_2 K_0 \rceil < \lceil \log_2 2L \rceil$).

In one example Ex0-1: The UE uses Alt0-4 if $\lceil \log_2 K_0 \rceil \geq \lceil \log_2 2L \rceil$, and uses Alt0-3 otherwise ($\lceil \log_2 K_0 \rceil \leq \lceil \log_2 2L \rceil$).

In one example Ex0-2: The UE uses Alt0-4 if $K_0 \geq 2L$, and uses Alt0-3 otherwise ($K_0 < 2L$).

In one example Ex0-3: The UE uses Alt0-4 if $K_0 > 2L$, and uses Alt0-3 otherwise ($K_0 \leq 2L$).

In one example Ex0-4: The UE uses Alt0-4 if $\beta M \geq 1$, and uses Alt0-3 otherwise ($\beta M < 1$).

In one example Ex0-5: The UE uses Alt0-4 if $\beta M > 1$, and uses Alt0-3 otherwise ($\beta M \leq 1$).

In one example Ex0-6: The UE uses Alt0-4 if $\lceil \log_2 K_{0,l} \rceil \geq \lceil \log_2 2L \rceil$, and uses Alt0-3 otherwise ($\lceil \log_2 K_{0,l} \rceil < \lceil \log_2 2L \rceil$).

In one example Ex0-7: The UE uses Alt0-4 if $\lceil \log_2 K_{0,l} \rceil > \lceil \log_2 2L \rceil$, and uses Alt0-3 otherwise ($\lceil \log_2 K_{0,l} \rceil \leq \lceil \log_2 2L \rceil$).

In one example Ex0-8: The UE uses Alt0-4 if $K_{0,l} \geq 2L$, and uses Alt0-3 otherwise ($K_{0,l} < 2L$).

In one example Ex0-9: The UE uses Alt0-4 if $K_{0,l} > 2L$, and uses Alt0-3 otherwise ($K_{0,l} \leq 2L$).

In one example Ex0-10: The UE uses Alt0-4 if $\beta M_l \geq 1$, and uses Alt0-3 otherwise ($\beta M_l < 1$).

In one example Ex0-11: The UE uses Alt0-4 if $\beta M_l > 1$, and uses Alt0-3 otherwise ($\beta M_l \leq 1$).

Note that in Ex0-0 through Ex0-5, $SCI_l$ is a $\lceil \log_2 \min(K_0, 2L) \rceil$-bit indicator, and in Ex0-6 through Ex0-11, the SCI payload is $\lceil \log_2 \min(K_{0,l}, 2L) \rceil$ bits.

In another example, two of these alternatives are supported, and the UE uses one of the two supported alternatives to report $SCI_l$ based on a fixed condition. For example, the supported alternatives are Alt0-0 and Alt0-4 for rank 1 and Alt0-3 and Alt0-4 for rank >1. For rank 1, the fixed condition is according to at least one of the following examples.

In one example Ex0-12: The UE uses Alt0-4 if $\lceil \log_2 K_{NZ,l} \rceil \geq \lceil \log_2 2L \rceil$, and uses Alt0-0 otherwise ($\lceil \log_2 K_{NZ,l} \rceil < \lceil \log_2 2L \rceil$).

In one example Ex0-13: The UE uses Alt0-4 if $\lceil \log_2 K_{NZ,l} \rceil > \lceil \log_2 2L \rceil$, and uses Alt0-0 otherwise ($\lceil \log_2 K_{NZ,l} \rceil \leq \lceil \log_2 2L \rceil$).

In one example Ex0-14: The UE uses Alt0-4 if $K_{NZ,l} \geq 2L$, and uses Alt0-0 otherwise ($K_{NZ,l} < 2L$).

In one example Ex0-15: The UE uses Alt0-4 if $K_{NZ,l} > 2L$, and uses Alt0-0 otherwise ($K_{NZ,l} \leq 2L$).

In one example Ex0-16: The UE uses Alt0-4 if $\beta M \geq 1$, and uses Alt0-0 otherwise ($\beta M < 1$).

In one example Ex0-17: The UE uses Alt0-4 if $\beta M > 1$, and uses Alt0-0 otherwise ($\beta M \leq 1$).

Note that in Ex0-12 through Ex0-17, $SCI_l$ is a $\lceil \log_2 \min(K_{NZ,l}, 2L) \rceil$-bit indicator. For rank >1, the fixed condition is according to at least one of the examples Ex0-0 through Ex0-11.

In another example, two of alternatives Alt0-1 through Alt0-5 are supported, and the UE uses one of the two supported alternatives to report $SCI_l$ based on a fixed condition. For example, the supported alternatives are Alt0-3 and Alt0-5, the fixed condition is according to at least one of the following examples.

In one example Ex0-18: The UE uses Alt0-5 if $\lceil \log_2 K_0 \rceil \geq \lceil \log_2 2LM_l \rceil$, and uses Alt0-3 otherwise ($\lceil \log_2 K_0 \rceil < \lceil \log_2 2LM_l \rceil$).

In one example Ex0-19: The UE uses Alt0-5 if $\lceil \log_2 K_0 \rceil \geq \lceil \log_2 2LM_l \rceil$, and uses Alt0-3 otherwise ($\lceil \log_2 K_0 \rceil \leq \lceil \log_2 2LM_l \rceil$).

In one example Ex0-20: The UE uses Alt0-5 if $K_0 \geq 2LM_l$, and uses Alt0-3 otherwise ($K_0 < 2LM_l$).

In one example Ex0-21: The UE uses Alt0-5 if $K_0 > 2LM_l$, and uses Alt0-3 otherwise ($K_0 \leq 2LM_l$).

In one example Ex0-22: The UE uses Alt0-5 if $\beta M \geq M_l$, and uses Alt0-3 otherwise ($\beta M < M_l$).

In one example Ex0-23: The UE uses Alt0-5 if $\beta M > M_l$, and uses Alt0-3 otherwise ($\beta M \leq M_l$).

In one example Ex0-24: The UE uses Alt0-5 if $\beta p \geq v_0$, and uses Alt0-3 otherwise ($\beta p < v_0$).

In one example Ex0-25: The UE uses Alt0-5 if $\beta p > v_0$, and uses Alt0-3 otherwise ($\beta p \leq v_0$).

In these examples, $K_0 = \lceil \beta \times 2LM \rceil$, $$M = \left\lceil p \times \frac{N_3}{R} \right\rceil, \text{ and } M_l = \left\lceil v_0 \times \frac{N_3}{R} \right\rceil,$$

where $\beta$, $p$, $v_0$, and $R$ is higher-layer configured parameters. In one example, parameter $p$ is configured for rank 1-2 and parameter $v_0$ is configured for rank 3-4. Note that in Ex0-18 through Ex0-25, $SCI_l$ is a $\lceil \log_2 \min(K_0, 2LM_l) \rceil$-bit indicator.

In one example, when any one of Alt0-0 through Alt0-3 is used, the UE determines the indices $\{k_{m_l}\}_{m_l=0}^{M_l-1}$ indicating the FD basis $$W_f = [w_{k_0}, w_{k_1}, \ldots w_{k_{M_l-1}}]$$

and the LC coefficients $\{c_{l,i,m}\}$, where the LC coefficients are mapped to UCI bits in a certain order, e.g. $c_{0,0}, c_{0,1}, \ldots, c_{1,0}, c_{1,1}, \ldots, \ldots, c_{2L-1,M_l-1}$ or $c_{0,0}, c_{1,0}, \ldots, c_{0,1}, c_{1,1}, \ldots, \ldots, c_{2L-1,M_l-1}$. The UE reports the indices $$\{k_{m_l}\}_{m_l=0}^{M_l-1}$$

and the LC coefficients $\{c_{l,i,m}\}$ along with $SCI_l$ with X bits, where X depends on the alternative used for SCI reporting.

In another example, when Alt0-4 is used, the UE determines the indices $$\{k_{m_l}\}_{m_l=0}^{M_l-1}$$

indicating the FD basis $$W_f = [w_{k_0}, w_{k_1}, \ldots w_{k_{M_l-1}}]$$

and the LC coefficients $\{c_{l,i,m}\}$. The UE reports in UCI the modulo-shifted FD-basis indices $$\{k'_{m_l} = \mathrm{mod}(k_{m_l} - k_{m_l^*}, N_3)\}_{m_l=0}^{M_l-1},$$

where $m_l^*$ is the FD index of the strongest coefficient. The UE then re-arranges LC coefficients as $c_{0,\mathrm{mod}(0+m_l^*,M_l)}, c_{0,\mathrm{mod}(1+m_l^*,M_l)}, \ldots, c_{1,\mathrm{mod}(0+m_l^*,M_l)}, c_{1,\mathrm{mod}(1+m_l^*,M_l)}, \ldots, \ldots, c_{2L-1,\mathrm{mod}(M_l-1+m_l^*,M_l)}$ or $c_{0,\mathrm{mod}(0+m_l^*,M_l)}, c_{1,\mathrm{mod}(0+m_l^*,M_l)}, \ldots, c_{0,\mathrm{mod}(1+m_l^*,M_l)}, c_{1,\mathrm{mod}(1+m_l^*,M_l)}, \ldots, \ldots, c_{2L-1,\mathrm{mod}(M_l-1+m_l^*,M_l)}$ and reports the re-arranged LC coefficients along with $SCI_l$ using $\lceil \log_2 2L \rceil$ bits.

In embodiment 1, for rank 1 (v=1), a UE is configured to report $SCI_l = SCI_0$ according to Alt0-X1, and for all rank >1 (v≥1), a UE is configured to report $SCI_l$ according to Alt0-X2, where X1≠X2, and X1, X2∈{0, 1 . . . , 4} as defined in embodiment 0. At least one of the following alternatives is used.

In one alternative Alt1-0, X1=0, i.e., $SCI_l$ is a $\lceil \log_2 K_{NZ,l} \rceil$-bit or $\lceil \log_2 K_{NZ,l} \rceil$-bit indicator for rank 1, and X2 is according to at least one of the following sub-alternatives.

In one alternative Alt1-0-0: X2=1, i.e., $SCI_l$ is a $\lceil \log_2 \min\{\sum_{l=0}^{v-1} K_{NZ,l}, 2L_lM_l\} \rceil$-bit indicator for rank >1

In one alternative Alt1-0-1: X2=2, i.e., $SCI_l$ is a $\lceil \log_2 2K_0 \rceil$ indicator for rank >1

In one alternative Alt1-0-2: X2=3, i.e., $SCI_l$ is a $\lceil \log_2 K_0 \rceil$-bit indicator for rank >1

In one alternative Alt1-0-3: X2=4, i.e., $SCI_l$ is a $\lceil \log_2 2L \rceil$-bit for rank >1

In one example, only one of these sub-alternatives is supported, e.g., Alt 1-0-2 or Alt 1-0-3. In another example, more than one (e.g. Alt 1-0-2 and Alt 1-0-3) of these alternatives are supported. If more than one alternatives is supported, then one of them is configured (e.g. via higher layer or MAC CE based or DCI based signalling). In another example, two of these alternatives are supported, and the UE uses one of the two supported alternatives to report $SCI_l$ based on a fixed condition. For example, the supported alternatives are Alt1-0-2 and Alt1-0-3, the fixed condition is according to at least one of the following examples.

In one example Ext-0-0: The UE uses Alt1-0-3 if $\lceil \log_2 K_0 \rceil \geq \lceil \log_2 2L \rceil$, and uses Alt1-0-2 otherwise ($\lceil \log_2 K_0 \rceil < \lceil \log_2 2L \rceil$).

In one example Ext-0-1: The UE uses Alt1-0-3 if $\lceil \log_2 K_0 \rceil \geq \lceil \log_2 2L \rceil$, and uses Alt1-0-2 otherwise ($\lceil \log_2 K_0 \rceil \leq \lceil \log_2 2L \rceil$).

In one example Ext-0-2: The UE uses Alt1-0-3 if $K_0 \geq 2L$, and uses Alt1-0-2 otherwise ($K_0 < 2L$).

In one example Ext-0-3: The UE uses Alt1-0-3 if $K_0 > 2L$, and uses Alt1-0-2 otherwise ($K_0 \leq 2L$).

In one example Ext-0-4: The UE uses Alt1-0-3 if $\beta M \geq 1$, and uses Alt1-0-2 otherwise ($\beta M < 1$).

In one example Ext-0-5: The UE uses Alt1-0-3 if $\beta M > 1$, and uses Alt1-0-2 otherwise ($\beta M \leq 1$).

In one example Ext-0-6: The UE uses Alt1-0-3 if $\lceil \log_2 K_{0,l} \rceil \geq \lceil \log_2 2L \rceil$, and uses Alt1-0-2 otherwise ($\lceil \log_2 K_{0,l} \rceil < \lceil \log_2 2L \rceil$).

In one example Ext-0-7: The UE uses Alt1-0-3 if $\lceil \log_2 K_{0,l} \rceil > \lceil \log_2 2L \rceil$, and uses Alt1-0-2 otherwise ($\lceil \log_2 K_{0,l} \rceil \leq \lceil \log_2 2L \rceil$).

In one example Ext-0-8: The UE uses Alt1-0-3 if $K_{0,l} \geq 2L$, and uses Alt1-0-2 otherwise ($K_{0,l} < 2L$).

In one example Ext-0-9: The UE uses Alt1-0-3 if $K_{0,l} > 2L$, and uses Alt1-0-2 otherwise ($K_{0,l} \leq 2L$).

In one example Ex1-0-10: The UE uses Alt1-0-3 if $\beta M_l \geq 1$, and uses Alt1-0-2 otherwise ($\beta M_l < 1$).

In one example Ex1-0-11: The UE uses Alt1-0-3 if $\beta M_l > 1$, and uses Alt1-0-2 otherwise ($\beta M_l \leq 1$).

Note that in Ext-0-0 through Ext-0-5, $SCI_l$ is a $\lceil \log_2 \min(K_0, 2L) \rceil$-bit indicator, and in Ext-0-6 through Ex1-0-11, the SCI payload is $\lceil \log_2 \min(K_{0,l}, 2L) \rceil$ bits.

In one alternative Alt1-0A, X1=0, i.e., $SCI_l$ is a $\lceil \log_2 K_{NZ,l} \rceil$-bit or a $\lceil \log_2 K_{NZ} \rceil$-bit indicator for rank 1, and X2=4, i.e., $SCI_l$ is a $\lceil \log_2 2L \rceil$-bit for rank >1. The index remapping or mapping, as explained below, is performed only for rank >1.

For rank >1, the location or index of the strongest coefficient for layer l before index remapping or mapping is $(i_l^*, m_l^*)$, and $SCI_l = i_l^*$ which is reported using a $\lceil \log_2 2L \rceil$-bit SCI indicator, and $m_l^*$ is not reported. For layer l, the index $(i_l, m_l)$ of all non-zero (NZ) coefficients $c_{l,i_l,m_l}$ is remapped or mapped with respect to $m_l^*$ to $\tilde{m}_l$ such that the strongest coefficient index is remapped or mapped as $(i_l^*, \tilde{m}_l^*) = (i_l^*, 0)$. The FD basis indices $\{k_{m_l}\}$ associated with all NZ coefficients are remapped or mapped with respect to $k_{m_l^*}$ to $\tilde{k}_{m_l}$ such that the FD basis index of the strongest coefficient is remapped or mapped as $k_{m_l^*} = 0$.

Because remapping or mapping is performed only in FD (i.e., no remapping or mapping of SD index $i_l$), the following is an equivalent remapping/mapping. For layer l, the index $m_l$ of each non-zero (NZ) coefficient $c_{l,i_l,m_l}$ is remapped or mapped with respect to $m_l^*$ to $\tilde{m}_l$ such that the strongest coefficient index is remapped or mapped as $\tilde{m}_l^* = 0$. The FD basis indices $\{k_{m_l}\}$ associated with each NZ coefficient $c_{l,i_l,m_l}$ is remapped or mapped with respect to $k_{m_l^*}$ to $\tilde{k}_{m_l}$ such that the FD basis index of the strongest coefficient is remapped or mapped as $\tilde{k}_{m_l^*} = 0$.

The UE reports the remapped sets $\{c_{l,i_l,\tilde{m}_l} \neq c_{l,i_l,0}\}$ and $\{\tilde{k}_{m_l} \neq 0\}$.

In one example, the remapping or mapping is performed as follows. The index $(i_l, m_l)$ of each non-zero (NZ) coefficient $c_{l,i_l,m_l}$ is remapped or mapped as $(i_l, m_l) \rightarrow (i_l, \tilde{m}_l = (m_l - m_l^*) \mod M_l)$. Alternatively, the index $m_l$ of each non-zero (NZ) coefficient $c_{l,i,m}$ is remapped or mapped as $m_l \rightarrow \tilde{m}_l = (m_l - m_l^*) \mod M_l$. The FD basis index $k_{m_l}$ associated with each NZ coefficient $c_{l,i_l,m_l}$ is remapped or mapped as $k_{m_l} \rightarrow \tilde{k}_{m_l} = (k_{m_l} - k_{m_l^*}) \mod N_3$.

In one alternative Alt1-0B, X1=0, i.e., $SCI_l$ is a $\lceil \log_2 K_{NZ,l} \rceil$-bit or a $\lceil \log_2 K_{NZ} \rceil$-bit indicator for rank 1, and X2=4, i.e., $SCI_l$ is a $\lceil \log_2 2L \rceil$-bit for rank >1. The index remapping or mapping, as explained in Alt1-0A, is performed for all rank (including rank 1).

In one alternative Alt1-1, X1=3, i.e., $SCI_l$ is a $\lceil \log_2 K_{NZ,l} \rceil$-bit indicator for rank 1, and X2 is according to at least one of the following sub-alternatives.

In one alternative Alt1-1-0: X2=1, i.e., $SCI_l$ is a $\lceil \log_2 \min\{\sum_{l=0}^{v-1} K_{NZ,l}, 2L_lM_l\} \rceil$-bit indicator for rank >1

In one alternative Alt1-1-1: X2=2, i.e., $SCI_l$ is a $\lceil \log_2 2K_0 \rceil$ indicator for rank >1

In one alternative Alt1-1-2: X2=4, i.e., $SCI_l$ is a $\lceil \log_2 2L \rceil$-bit for rank >1

In one example, only one of these sub-alternatives is supported, e.g., Alt 1-1-2. In another example, more than one (e.g. Alt 1-1-0 and Alt 1-1-2) of these alternatives are supported. If more than one alternatives is supported, then one of them is configured (e.g. via higher layer or MAC CE based or DCI based signaling). In another example, for rank >1, the UE either uses a $\lceil \log_2 K_0 \rceil$-bit indicator or one of the alternatives (Alt1-1-0, 1-1-1, and 1-1-2) to report $SCI_l$ based on a fixed condition. For example, the one of the alternatives is Alt1-1-2, the fixed condition is according to at least one of the following examples.

In one example Ex1-1-0: The UE uses Alt1-1-2 if $\lceil \log_2 K_0 \rceil \geq \lceil \log_2 2L \rceil$, and uses a $\lceil \log_2 K_0 \rceil$-bit indicator otherwise ($\lceil \log_2 K_0 \rceil < \lceil \log_2 2L \rceil$).

In one example Ex1-1-1: The UE uses Alt1-1-2 if $\lceil \log_2 K_0 \rceil \geq \lceil \log_2 2L \rceil$, and uses a $\lceil \log_2 K_0 \rceil$-bit indicator otherwise ($\lceil \log_2 K_0 \rceil \leq \lceil \log_2 2L \rceil$).

In one example Ex1-1-2: The UE uses Alt1-1-2 if $K_0 \geq 2L$, and uses a $\lceil \log_2 K_0 \rceil$-bit indicator otherwise ($K_0 < 2L$).

In one example Ex1-1-3: The UE uses Alt1-1-2 if $K_0 > 2L$, and uses a $\lceil \log_2 K_0 \rceil$-bit indicator otherwise ($K_0 \leq 2L$).

In one example Ex1-1-4: The UE uses Alt1-1-2 if $\beta M \geq 1$, and uses a $\lceil \log_2 K_0 \rceil$-bit indicator otherwise ($\beta M < 1$).

In one example Ex1-1-5: The UE uses Alt1-1-2 if $\beta M > 1$, and uses a $\lceil \log_2 K_0 \rceil$-bit indicator otherwise ($\beta M \leq 1$).

In one example Ex1-1-6: The UE uses Alt1-1-2 if $\lceil \log_2 K_{0,l} \rceil \geq \lceil \log_2 2L \rceil$, and uses a $\lceil \log_2 K_{0,l} \rceil$-bit indicator otherwise ($\lceil \log_2 K_{0,l} \rceil < \lceil \log_2 2L \rceil$).

In one example Ex1-1-7: The UE uses Alt1-1-2 if $\lceil \log_2 K_{0,l} \rceil > \lceil \log_2 2L \rceil$, and uses a $\lceil \log_2 K_{0,l} \rceil$-bit indicator otherwise ($\lceil \log_2 K_{0,l} \rceil \leq \lceil \log_2 2L \rceil$).

In one example Ex1-1-8: The UE uses Alt1-1-2 if $K_{0,l} \geq 2L$, and uses a $\lceil \log_2 K_{0,l} \rceil$-bit indicator otherwise ($K_{0,l} < 2L$).

In one example Ex1-1-9: The UE uses Alt1-1-2 if $K_{0,l} > 2L$, and uses a $\lceil \log_2 K_{0,l} \rceil$-bit indicator otherwise ($K_{0,l} \leq 2L$).

In one example Ex1-1-10: The UE uses Alt1-1-2 if $\beta M_l \geq 1$, and uses a $\lceil \log_2 K_{0,l} \rceil$-bit indicator otherwise ($\beta M_l < 1$).

In one example Ex1-1-11: The UE uses Alt1-1-2 if $\beta M_l > 1$, and uses a $\lceil \log_2 K_{0,l} \rceil$-bit indicator otherwise ($\beta M_l \leq 1$).

Note that in Ext-1-0 through Ex1-1-5, $SCI_l$ is a $\lceil \log_2 \min(K_0, 2L) \rceil$-bit indicator, and in Ex1-1-6 through Ex1-1-11, the SCI payload is $\lceil \log_2 \min(K_{0,l}, 2L) \rceil$ bits.

In embodiment 2, for rank 1-2 ($v=1,2$), a UE is configured to report $SCI_l$ according to Alt0-X1, and for all rank >2 ($v>2$), a UE is configured to report $SCI_l$ according to Alt0-X2, where X1≠X2, and X1, X2∈{0, 1 . . . , 4} as defined in embodiment 0. At least one of the following alternatives is used.

In one alternative Alt2-0, X1=0, i.e., $SCI_l$ is a $\lceil \log_2 K_{NZ,l} \rceil$-bit indicator for rank 1-2, and X2 is according to at least one of the following sub-alternatives.

In one alternative Alt2-0-0: X2=1, i.e., $SCI_l$ is a $\lceil \log_2 \min\{\Sigma_{l=0}^{v-1} K_{NZ,l} 2, 2L_l M_l\} \rceil$-bit indicator for rank >2.

In one alternative Alt2-0-1: X2=2, i.e., $SCI_l$ is a $\lceil \log_2 2K_0 \rceil$ indicator for rank >2.

In one alternative Alt2-0-2: X2=3, i.e., $SCI_l$ is a $\lceil \log_2 K_0 \rceil$-bit indicator for rank >2.

In one alternative Alt2-0-3: X2=4, i.e., $SCI_l$ is a $\lceil \log_2 2L \rceil$-bit for rank >2.

In one example, only one of these sub-alternatives is supported, e.g., Alt 2-0-2 or Alt 2-0-3. In another example, more than one (e.g. Alt 2-0-2 and Alt 2-0-3) of these alternatives are supported. If more than one alternatives is supported, then one of them is configured (e.g. via higher layer or MAC CE based or DCI based signalling). In another example, two of these alternatives are supported, and the UE uses one of the two supported alternatives to report $SCI_l$ based on a fixed condition. For example, the supported alternatives are Alt2-0-2 and Alt2-0-3, the fixed condition is according to at least one of the following examples.

In one example Ex2-0-0: The UE uses Alt2-0-3 if $\lceil \log_2 K_0 \rceil \geq \lceil \log_2 2L \rceil$, and uses Alt2-0-2 otherwise ($\lceil \log_2 K_0 \rceil < \lceil \log_2 2L \rceil$).

In one example Ex2-0-1: The UE uses Alt2-0-3 if $\lceil \log_2 K_0 \rceil \geq \lceil \log_2 2L \rceil$, and uses Alt2-0-2 otherwise ($\lceil \log_2 K_0 \rceil \leq \lceil \log_2 2L \rceil$).

In one example Ex2-0-2: The UE uses Alt2-0-3 if $K_0 \geq 2L$, and uses Alt2-0-2 otherwise ($K_0 < 2L$).

In one example Ex2-0-3: The UE uses Alt2-0-3 if $K_0 > 2L$, and uses Alt2-0-2 otherwise ($K_0 \leq 2L$).

In one example Ex2-0-4: The UE uses Alt2-0-3 if $\beta M \geq 1$, and uses Alt2-0-2 otherwise ($\beta M < 1$).

In one example Ex2-0-5: The UE uses Alt2-0-3 if $\beta M > 1$, and uses Alt2-0-2 otherwise ($\beta M \leq 1$).

In one example Ex2-0-6: The UE uses Alt2-0-3 if $\lceil \log_2 K_{0,l} \rceil \geq \lceil \log_2 2L \rceil$, and uses Alt2-0-2 otherwise ($\lceil \log_2 K_{0,l} \rceil < \lceil \log_2 2L \rceil$).

In one example Ex2-0-7: The UE uses Alt2-0-3 if $\lceil \log_2 K_{0,l} \rceil > \lceil \log_2 2L \rceil$, and uses Alt2-0-2 otherwise ($\lceil \log_2 K_{0,l} \rceil \leq \lceil \log_2 2L \rceil$).

In one example Ex2-0-8: The UE uses Alt2-0-3 if $K_{0,l} \geq 2L$, and uses Alt2-0-2 otherwise ($K_{0,l} < 2L$).

In one example Ex2-0-9: The UE uses Alt2-0-3 if $K_{0,l} > 2L$, and uses Alt2-0-2 otherwise ($K_{0,l} \leq 2L$).

In one example Ex2-0-10: The UE uses Alt2-0-3 if $\beta M_l \geq 1$, and uses Alt2-0-2 otherwise ($\beta M_l < 1$).

In one example Ex2-0-11: The UE uses Alt2-0-3 if $\beta M_l > 1$, and uses Alt2-0-2 otherwise ($\beta M_l \leq 1$).

Note that in Ex2-0-0 through Ex2-0-5, $SCI_l$ is a $\lceil \log_2 \min(K_0, 2L) \rceil$-bit indicator, and in Ex2-0-6 through Ex2-0-11, the SCI payload is $\lceil \log_2 \min(K_{0,l}, 2L) \rceil$ bits.

In one alternative Alt2-1, X1=3, i.e., $SCI_l$ is a $\lceil \log_2 K_0 \rceil$-bit indicator for rank 1-2, and X2 is according to at least one of the following sub-alternatives.

In one alternative Alt2-1-0: X2=1, i.e., $SCI_l$ is a $\lceil \log_2 \min\{\Sigma_{l=0}^{v-1} K_{NZ,l} 2, 2L_l M_l\} \rceil$-bit indicator for rank >2.

In one alternative Alt2-1-1: X2=2, i.e., $SCI_l$ is a $\lceil \log_2 2K_0 \rceil$ indicator for rank >2.

In one alternative Alt2-1-2: X2=4, i.e., $SCI_l$ is a $\lceil \log_2 2L \rceil$-bit for rank >2.

In one example, only one of these sub-alternatives is supported, e.g., Alt 2-1-2. In another example, more than one (e.g., Alt 2-1-0 and Alt 2-1-2) of these alternatives are supported. If more than one alternatives is supported, then one of them is configured (e.g. via higher layer or MAC CE based or DCI based signaling). In another example, for rank >1, the UE either uses a $\lceil \log_2 K_0 \rceil$-bit indicator or one of the alternatives (Alt2-1-0, 2-1-1, and 2-1-2) to report $SCI_l$ based on a fixed condition. For example, the one of the alternatives is Alt2-1-2, the fixed condition is according to at least one of the following examples.

In one example Ex2-1-0: The UE uses Alt2-1-2 if $\lceil \log_2 K_0 \rceil \geq \lceil \log_2 2L \rceil$, and uses a $\lceil \log_2 K_0 \rceil$-bit indicator otherwise ($\lceil \log_2 K_0 \rceil < \lceil \log_2 2L \rceil$).

In one example Ex2-1-1: The UE uses Alt2-1-2 if $\lceil \log_2 K_0 \rceil \geq \lceil \log_2 2L \rceil$, and uses a $\lceil \log_2 K_0 \rceil$-bit indicator otherwise ($\lceil \log_2 K_0 \rceil \leq \lceil \log_2 2L \rceil$).

In one example Ex2-1-2: The UE uses Alt2-1-2 if $K_0 \geq 2L$, and uses a $\lceil \log_2 K_0 \rceil$-bit indicator otherwise ($K_0 < 2L$).

In one example Ex2-1-3: The UE uses Alt2-1-2 if $K_0 > 2L$, and uses a $\lceil \log_2 K_0 \rceil$-bit indicator otherwise ($K_0 \leq 2L$).

In one example Ex2-1-4: The UE uses Alt2-1-2 if $\beta M \geq 1$, and uses a $\lceil \log_2 K_0 \rceil$-bit indicator otherwise ($\beta M < 1$).

In one example Ex2-1-5: The UE uses Alt2-1-2 if $\beta M > 1$, and uses a $\lceil \log_2 K_0 \rceil$-bit indicator otherwise ($\beta M \leq 1$).

In one example Ex2-1-6: The UE uses Alt2-1-2 if $\lceil \log_2 K_{0,l} \rceil \geq \lceil \log_2 2L \rceil$, and uses a $\lceil \log_2 K_{0,l} \rceil$-bit indicator otherwise ($\lceil \log_2 K_{0,l} \rceil < \lceil \log_2 2L \rceil$).

In one example Ex2-1-7: The UE uses Alt2-1-2 if $\lceil \log_2 K_{0,l} \rceil > \lceil \log_2 2L \rceil$, and uses a $\lceil \log_2 K_{0,l} \rceil$-bit indicator otherwise ($\lceil \log_2 K_{0,l} \rceil \leq \lceil \log_2 2L \rceil$).

In one example Ex2-1-8: The UE uses Alt2-1-2 if $K_{0,l} \geq 2L$, and uses a $\lceil \log_2 K_{0,l} \rceil$-bit indicator otherwise ($K_{0,l} < 2L$).

In one example Ex2-1-9: The UE uses Alt2-1-2 if $K_{0,l} > 2L$, and uses a $\lceil \log_2 K_{0,l} \rceil$-bit indicator otherwise ($K_{0,l} \leq 2L$).

In one example Ex2-1-10: The UE uses Alt2-1-2 if $\beta M_l \geq 1$, and uses a $\lceil \log_2 K_{0,l} \rceil$-bit indicator otherwise ($\beta M_l < 1$).

In one example Ex2-1-11: The UE uses Alt2-1-2 if $\beta M_l > 1$, and uses a $\lceil \log_2 K_{0,l} \rceil$-bit indicator otherwise ($\beta M_l \leq 1$).

Note that in Ex2-1-0 through Ex2-1-5, $SCI_l$ is a $\lceil \log_2 \min(K_0, 2L) \rceil$-bit indicator, and in Ex2-1-6 through Ex2-1-11, the SCI payload is $\lceil \log_2 \min(K_{0,l}, 2L) \rceil$ bits.

In embodiment 3, for rank 1 (v=1), a UE is configured to report $SCI_l = SCI_0$ according to Alt0-X1, for rank 2 (v=2), a UE is configured to report $SCI_l$ according to Alt0-X2, and for all rank >2 (v>2), a UE is configured to report $SCI_l$ according to Alt0-X3, where X1≠X2≠X3, and X1, X2, X3∈{0, 1 ..., 4} as defined in embodiment 0. At least one of the following alternatives is used.

In one alternative Alt3-0, X1=0, i.e., $SCI_l$ is a $\lceil \log_2 K_{NZ,l} \rceil$-bit indicator for rank 1, X2=3, i.e., $SCI_l$ is a $\lceil \log_2 K_0 \rceil$-bit indicator for rank 2, and X3 is according to at least one of the following sub-alternatives.

In one alternative Alt3-0-0: X3=1, i.e., $SCI_l$ is a $\lceil \log_2 \min\{\Sigma_{l=0}^{v-1} K_{NZ,l}, 2L_l M_l\} \rceil$-bit indicator for rank >2.

In one alternative Alt3-0-1: X3=2, i.e., $SCI_l$ is a $\lceil \log_2 2K_0 \rceil$ indicator for rank >2.

In one alternative Alt3-0-2: X3=4, i.e., $SCI_l$ is a $\lceil \log_2 2L \rceil$-bit for rank >2.

In one example, only one of these sub-alternatives is supported, e.g., Alt 3-0-2. In another example, more than one (e.g. Alt 3-0-0 and Alt 3-0-2) of these alternatives are supported. If more than one alternative is supported, then one of them is configured (e.g. via higher layer or MAC CE based or DCI based signaling). In another example, for rank >2, the UE either uses a $\lceil \log_2 K_0 \rceil$-bit indicator or one of the alternatives (Alt3-0-0, 3-0-1, and 3-0-2) to report $SCI_l$ based on a fixed condition. For example, the one of the alternatives is Alt3-0-2, the fixed condition is according to at least one of the following examples.

In one example Ex3-0-0: The UE uses Alt3-0-2 if $\lceil \log_2 K_0 \rceil \geq \lceil \log_2 2L \rceil$, and uses a $\lceil \log_2 K_0 \rceil$-bit indicator otherwise ($\lceil \log_2 K_0 \rceil < \lceil \log_2 2L \rceil$).

In one example Ex3-0-1: The UE uses Alt3-0-2 if $\lceil \log_2 K_0 \rceil \geq \lceil \log_2 2L \rceil$, and uses a $\lceil \log_2 K_0 \rceil$-bit indicator otherwise ($\lceil \log_2 K_0 \rceil \leq \lceil \log_2 2L \rceil$).

In one example Ex3-0-2: The UE uses Alt3-0-2 if $K_0 \geq 2L$, and uses a $\lceil \log_2 K_0 \rceil$-bit indicator otherwise ($K_0 < 2L$).

In one example Ex3-0-3: The UE uses Alt3-0-2 if $K_0 > 2L$, and uses a $\lceil \log_2 K_0 \rceil$-bit indicator otherwise ($K_0 \leq 2L$).

In one example Ex3-0-4: The UE uses Alt3-0-2 if $\beta M \geq 1$, and uses a $\lceil \log_2 K_0 \rceil$-bit indicator otherwise ($\beta M < 1$).

In one example Ex3-0-5: The UE uses Alt3-0-2 if $\beta M > 1$, and uses a $\lceil \log_2 K_0 \rceil$-bit indicator otherwise ($\beta M \leq 1$).

In one example Ex3-0-6: The UE uses Alt3-0-2 if $\lceil \log_2 K_{0,l} \rceil \geq \lceil \log_2 2L \rceil$, and uses a $\lceil \log_2 K_{0,l} \rceil$-bit indicator otherwise ($\lceil \log_2 K_{0,l} \rceil < \lceil \log_2 2L \rceil$).

In one example Ex3-0-7: The UE uses Alt3-0-2 if $\lceil \log_2 K_{0,l} \rceil > \lceil \log_2 2L \rceil$, and uses a $\lceil \log_2 K_{0,l} \rceil$-bit indicator otherwise ($\lceil \log_2 K_{0,l} \rceil \leq \lceil \log_2 2L \rceil$).

In one example Ex3-0-8: The UE uses Alt3-0-2 if $K_{0,l} \geq 2L$, and uses a $\lceil \log_2 K_{0,l} \rceil$-bit indicator otherwise ($K_{0,l} < 2L$).

In one example Ex3-0-9: The UE uses Alt3-0-2 if $K_{0,l} \geq 2L$, and uses a $\lceil \log_2 K_{0,l} \rceil$-bit indicator otherwise ($K_{0,l} \leq 2L$).

In one example Ex3-0-10: The UE uses Alt3-0-2 if $\beta M_l \geq 1$, and uses a $\lceil \log_2 K_{0,l} \rceil$-bit indicator otherwise ($\beta M_l < 1$).

In one example Ex3-0-11: The UE uses Alt3-0-2 if $\beta M_l > 1$, and uses a $\lceil \log_2 K_{0,l} \rceil$-bit indicator otherwise ($\beta M_l \leq 1$).

Note that in Ex3-0-0 through Ex3-0-5, $SCI_l$ is a $\lceil \log_2 \min(K_0, 2L) \rceil$-bit indicator, and in Ex3-0-6 through Ex3-0-11, the SCI payload is $\lceil \log_2 \min(K_{0,l}, 2L) \rceil$ bits.

In one alternative Alt3-1, X1=0, i.e., $SCI_l$ is a $\lceil \log_2 K_{NZ,l} \rceil$-bit indicator for rank 1, X2=2, i.e., $SCI_l$ is a $\lceil \log_2 \min\{\Sigma_{l=0}^{v-1} K_{NZ,l}, 2L_l M_l\} \rceil$-bit indicator for rank 2, and X3 is according to at least one of the following sub-alternatives.

In one alternative Alt3-1-0: X3=1, i.e., $SCI_l$ is a $\lceil \log_2 \min\{\Sigma_{l=0}^{v-1} K_{NZ,l}, 2L_l, m_l\} \rceil$-bit indicator for rank >2.

In one alternative Alt3-1-1: X3=3, i.e., $SCI_l$ is a $\lceil \log_2 K_0 \rceil$ indicator for rank >2.

In one alternative Alt3-1-2: X3=4, i.e., $SCI_l$ is a $\lceil \log_2 2L \rceil$-bit for rank >2.

In one example, only one of these sub-alternatives is supported, e.g., Alt 3-1-2. In another example, more than one (e.g. Alt 3-1-0 and Alt 3-1-2) of these alternatives are supported. If more than one alternative is supported, then one of them is configured (e.g. via higher layer or MAC CE based or DCI based signalling). In another example, two of these alternatives are supported, and the UE uses one of the two supported alternatives to report $SCI_l$ based on a fixed condition. For example, the supported alternatives are Alt3-1-1 and Alt3-1-2, the fixed condition is according to at least one of the following examples.

In one alternative Alt3-1-0: The UE uses Alt3-1-2 if $\lceil \log_2 K_0 \rceil \geq \lceil \log_2 2L \rceil$, and uses Alt3-1-1 otherwise ($\lceil \log_2 K_0 \rceil < \lceil \log_2 2L \rceil$).

In one alternative Alt3-1-1: The UE uses Alt3-1-2 if $\lceil \log_2 K_0 \rceil \geq \lceil \log_2 2L \rceil$, and uses Alt3-1-1 otherwise ($\lceil \log_2 K_0 \rceil \leq \lceil \log_2 2L \rceil$).

In one alternative Alt3-1-2: The UE uses Alt3-1-2 if $K_0 \geq 2L$, and uses Alt3-1-1 otherwise ($K_0 < 2L$).

In one alternative Alt3-1-3: The UE uses Alt3-1-2 if $K_0 > 2L$, and uses Alt3-1-1 otherwise ($K_0 \leq 2L$).

In one alternative Alt3-1-4: The UE uses Alt3-1-2 if $\beta M \geq 1$, and uses Alt3-1-1 otherwise ($\beta M < 1$).

In one alternative Alt3-1-5: The UE uses Alt3-1-2 if $\beta M > 1$, and uses Alt3-1-1 otherwise ($\beta M \leq 1$).

In one alternative Alt3-1-6: The UE uses Alt3-1-2 if $\lceil \log_2 K_{0,l} \rceil \geq \lceil \log_2 2L \rceil$, and uses Alt3-1-1 otherwise ($\lceil \log_2 K_{0,l} \rceil < \lceil \log_2 2L \rceil$).

In one alternative Alt3-1-7: The UE uses Alt3-1-2 if $\lceil \log_2 K_{0,l} \rceil > \lceil \log_2 2L \rceil$, and uses Alt3-1-1 otherwise ($\lceil \log_2 K_{0,l} \rceil \leq \lceil \log_2 2L \rceil$).

In one alternative Alt3-1-8: The UE uses Alt3-1-2 if $K_{0,l} \geq 2L$, and uses Alt3-1-1 otherwise ($K_{0,l} < 2L$).

In one alternative Alt3-1-9: The UE uses Alt3-1-2 if $K_{0,l} > 2L$, and uses Alt3-1-1 otherwise ($K_{0,l} \leq 2L$).

In one alternative Alt3-1-10: The UE uses Alt3-1-2 if $\beta M_l \geq 1$, and uses Alt3-1-1 otherwise ($\beta M_l < 1$).

In one alternative Alt3-1-11: The UE uses Alt3-1-2 if $\beta M_l > 1$, and uses Alt3-1-1 otherwise ($\beta M_l \leq 1$).

Note that in Ex3-1-0 through Ex3-1-5, $SCI_l$ is a $\lceil \log_2 \min(K_0, 2L) \rceil$-bit indicator, and in Ex3-1-6 through Ex3-1-11, the SCI payload is $\lceil \log_2 \min(K_{0,l}, 2L) \rceil$ bits.

In one alternative Alt3-2, X1=3, i.e., $SCI_l$ is a $\lceil \log_2 K_0 \rceil$-bit indicator for rank 1, X2=2, i.e., $SCI_l$ is a $\lceil \log_2 \min\{\Sigma_{l=0}^{v-1} K_{NZ,l}, 2L_lM_l\} \rceil$-bit indicator for rank 2, and X3 is according to at least one of the following sub-alternatives.

In one alternative Alt3-2-0: X3=0, i.e., $SCI_l$ is a $\lceil \log_2 K_{NZ,l} \rceil$-bit indicator for rank >2.

In one alternative Alt3-2-1: X3=3, i.e., $SCI_l$ is a $\lceil \log_2 K_0 \rceil$ indicator for rank >2.

In one alternative Alt3-2-2: X3=4, i.e., $SCI_l$ is a $\lceil \log_2 2L \rceil$-bit for rank >2.

In one example, only one of these sub-alternatives is supported, e.g., Alt 3-2-2. In another example, more than one (e.g. Alt 3-2-0 and Alt 3-2-2) of these alternatives are supported. If more than one alternative is supported, then one of them is configured (e.g. via higher layer or MAC CE based or DCI based signaling). In another example, two of these alternatives are supported, and the UE uses one of the two supported alternatives to report $SCI_l$ based on a fixed condition. For example, the supported alternatives are Alt3-1-1 and Alt3-1-2, the fixed condition is according to at least one of the examples Ex3-1-0 through Ex3-1-11.

In embodiment 4, a UE is configured to report $SCI_l$ as follows.

For rank 1 (v=1), a UE is configured to report $SCI_i = SCI_0$ according to Alt0-0, i.e., $SCI_l$ is a $\lceil \log_2 K_{NZ,l} \rceil$-bit indicator.

For rank 2 (v=2), a UE is configured to report $SCI_l$ according to Alt0-3, i.e., $SCI_l$ is a $\lceil \log_2 K_0 \rceil$-bit indicator.

For rank 3-4 (v=3,4), a UE is configured to report $SCI_l$ according to either Alt0-3 or Alt0-5 based on a condition (where the condition is one of Ex0-18 through Ex0-25), i.e., $SCI_l$ is a $\lceil \log_2 \min(K_0, 2LM_l) \rceil$-bit indicator. The $SCI_l$ payload according to Ex0-24 and Ex0-25 are shown in Table 1 and Table 2, respectively. $K_0 = \lceil \beta \times 2LM \rceil$, $$M = \left\lceil p \times \frac{N_3}{R} \right\rceil, \text{ and } M_l = \left\lceil v_0 \times \frac{N_3}{R} \right\rceil,$$

where $\beta$, p, $v_0$, and R is higher-layer configured parameters. In one example, parameter p is configured for rank 1-2 and parameter $v_0$ is configured for rank 3-4. In one example, $p \in \{1/4, 1/2\}$ and $v_0 \in \{1/4, 1/8\}$. In another example, $(p, v_0) \in \{(1/2, 1/4), (1/4, 1/4), (1/4, 1/8)\}$. In another example, $(p, v_0) \in \{(1/2, 1/4), (1/4, 1/4)\}$. In another example, $(p, v_0) \in \{(1/2, 1/4), (1/4, 1/8)\}$.

TABLE 1

SCI$_l$ payload according to Ex0-24

| | | | SCI$_l$ payload | |
|---|---|---|---|---|
| p | β | pβ | $v_0 = \frac{1}{4}$ | $v_0 = \frac{1}{8}$ |
| $\frac{1}{4}$ | $\frac{1}{4}$ | $\frac{1}{16}$ | $\lceil \log_2 K_0 \rceil$ | $\lceil \log_2 K_0 \rceil$ |
| | $\frac{1}{2}$ | $\frac{1}{8}$ | $\lceil \log_2 K_0 \rceil$ | $\lceil \log_2 2LM_l \rceil$ |
| | $\frac{3}{4}$ | $\frac{3}{16}$ | $\lceil \log_2 K_0 \rceil$ | $\lceil \log_2 2LM_l \rceil$ |
| $\frac{1}{2}$ | $\frac{1}{4}$ | $\frac{1}{8}$ | $\lceil \log_2 K_0 \rceil$ | $\lceil \log_2 2LM_l \rceil$ |

TABLE 1-continued

SCI$_l$ payload according to Ex0-24

| | | | SCI$_l$ payload | |
|---|---|---|---|---|
| p | β | pβ | $v_0 = \frac{1}{4}$ | $v_0 = \frac{1}{8}$ |
| | $\frac{1}{2}$ | $\frac{1}{4}$ | $\lceil \log_2 2LM_l \rceil$ | $\lceil \log_2 2LM_l \rceil$ |
| | $\frac{3}{4}$ | $\frac{3}{8}$ | $\lceil \log_2 2LM_l \rceil$ | $\lceil \log_2 2LM_l \rceil$ |

TABLE 2

SCI$_l$ payload according to Ex0-25

| | | | SCI$_l$ payload | |
|---|---|---|---|---|
| p | β | pβ | $v_0 = \frac{1}{4}$ | $v_0 = \frac{1}{8}$ |
| $\frac{1}{4}$ | $\frac{1}{4}$ | $\frac{1}{16}$ | $\lceil \log_2 K_0 \rceil$ | $\lceil \log_2 K_0 \rceil$ |
| | $\frac{1}{2}$ | $\frac{1}{8}$ | $\lceil \log_2 K_0 \rceil$ | $\lceil \log_2 K_0 \rceil$ |
| | $\frac{3}{4}$ | $\frac{3}{16}$ | $\lceil \log_2 K_0 \rceil$ | $\lceil \log_2 2LM_l \rceil$ |
| $\frac{1}{2}$ | $\frac{1}{4}$ | $\frac{1}{8}$ | $\lceil \log_2 K_0 \rceil$ | $\lceil \log_2 K_0 \rceil$ |
| | $\frac{1}{2}$ | $\frac{1}{4}$ | $\lceil \log_2 K_0 \rceil$ | $\lceil \log_2 2LM_l \rceil$ |
| | $\frac{3}{4}$ | $\frac{3}{8}$ | $\lceil \log_2 2LM_l \rceil$ | $\lceil \log_2 2LM_l \rceil$ |

In embodiment 4A, a UE is configured to report $SCI_l$ as follows.

For rank 1-2 (v=1,2), a UE is configured to report $SCI_l$ according to Alt0-3, i.e., $SCI_l$ is a $\lceil \log_2 K_0 \rceil$-bit indicator.

For rank 3-4 (v=3,4), a UE is configured to report $SCI_l$ according to either Alt0-3 or Alt0-5 based on a condition (where the condition is one of Ex0-18 through Ex0-25), i.e., $SCI_l$ is a $\lceil \log_2 \min(K_0, 2LM_l) \rceil$-bit indicator. The $SCI_l$ payload according to Ex0-24 and Ex0-25 are shown in Table 1 and Table 2 respectively. $K_0 = \lceil \beta \times 2LM \rceil$, $$M = \left\lceil p \times \frac{N_3}{R} \right\rceil, \text{ and } M_l = \left\lceil v_0 \times \frac{N_3}{R} \right\rceil,$$

where $\beta$, p, $v_0$, and R is higher-layer configured parameters. In one example, parameter p is configured for rank 1-2 and parameter $v_0$ is configured for rank 3-4. In one example, $p \in \{1/4, 1/2\}$ and $v_0 \in \{1/4, 1/8\}$. In another example, $(p, v_0) \in \{(1/2, 1/4), (1/4, 1/4), (1/4, 1/8)\}$. In another example, $(p, v_0) \in \{(1/2, 1/4), (1/4, 1/4)\}$. In another example, $(p, v_0) \in \{(1/2, 1/4), (1/4, 1/8)\}$.

In embodiment 4B, a UE is configured to report $SCI_l$ as follows.

For rank 1-2 (v=1,2), a UE is configured to report $SCI_l$ according to Alt0-3, i.e., $SCI_l$ is a $\lceil \log_2 K_0 \rceil$-bit indicator.

For rank 3 (v=3), a UE is configured to report $SCI_l$ according to either Alt0-3 or Alt0-5 based on a condition (where the condition is one of Ex0-18 through Ex0-25), i.e., $SCI_l$ is a $\lceil \log_2 \min(K_0, 2LM_l) \rceil$-bit indicator. The $SCI_l$ payload according to Ex0-24 and Ex0-25 are shown in Table 1 and Table 2, respectively.

For rank 4 (v=4), a UE is configured to report $SCI_l$ according to Alt0-4, i.e., $SCI_l$ is a $\lceil \log_2 2L \rceil$-bit indicator.

$K_0 = \lceil \beta \times 2LM \rceil$, $$M = \left\lceil p \times \frac{N_3}{R} \right\rceil, \text{ and } M_l = \left\lceil v_0 \times \frac{N_3}{R} \right\rceil,$$

where $\beta$, p, $v_0$, and R is higher-layer configured parameters. In one example, parameter p is configured for rank 1-2 and parameter $v_0$ is configured for rank 3-4. In one example, $p \in \{1/4, 1/2\}$ and $v_0 \in \{1/4, 1/8\}$. In another example, $(p,v_0) \in \{(1/2,1/4),(1/4,1/4),(1/4,1/8)\}$. In another example, $(p,v_0) \in \{(1/2,1/4),(1/4,1/4)\}$. In another example, $(p,v_0) \in \{(1/2,1/4),(1/4,1/8)\}$.

In embodiment 4C, a UE is configured to report $SCI_l$ as follows.

For rank 1 (v=1), a UE is configured to report $SCI_l = SCI_0$ according to Alt0-0, i.e., $SCI_l$ is a $\lceil \log_2 K_{NZ,l} \rceil$-bit indicator.

For rank 2 (v=2), a UE is configured to report $SCI_l$ according to Alt0-3, i.e., $SCI_l$ is a $\lceil \log_2 K_0 \rceil$-bit indicator.

For rank 3 (v=3), a UE is configured to report $SCI_l$ according to either Alt0-3 or Alt0-5 based on a condition (where the condition is one of Ex0-18 through Ex0-25), i.e., $SCI_l$ is a $\lceil \log_2 \min(K_0, 2LM_l) \rceil$-bit indicator. The $SCI_l$ payload according to Ex0-24 and Ex0-25 are shown in Table 1 and Table 2, respectively.

For rank 4 (v=4), a UE is configured to report $SCI_l$ according to Alt0-4, i.e., $SCI_l$ is a $\lceil \log_2 2L \rceil$-bit indicator.

$K_0 = \lceil \beta \times 2LM \rceil$, $$M = \left\lceil p \times \frac{N_3}{R} \right\rceil, \text{ and } M_l = \left\lceil v_0 \times \frac{N_3}{R} \right\rceil,$$

where $\beta$, p, $v_0$, and R is higher-layer configured parameters. In one example, parameter p is configured for rank 1-2 and parameter $v_0$ is configured for rank 3-4. In one example, $p \in \{1/4, 1/2\}$ and $v_0 \in \{1/4, 1/8\}$. In another example, $(p,v_0) \in \{(1/2,1/4),(1/4,1/4),(1/4,1/8)\}$. In another example, $(p,v_0) \in \{(1/2,1/4),(1/4,1/4)\}$. In another example, $(p,v_0) \in \{(1/2,1/4),(1/4,1/8)\}$.

In embodiment 4D, a UE is configured to report $SCI_l$ as follows.

For rank 1-2 (v=1,2), a UE is configured to report $SCI_l$ according to Alt0-3, i.e., $SCI_l$ is a $\lceil \log_2 K_0 \rceil$-bit indicator.

For rank 3 (v=3), a UE is configured to report $SCI_l$ according to either Alt0-3 or Alt0-5 based on a condition (where the condition is one of Ex0-18 through Ex0-25), i.e., $SCI_l$ is a $\lceil \log_2 \min(K_0, 2LM_l) \rceil$-bit indicator. The $SCI_l$ payload according to Ex0-24 and Ex0-25 are shown in Table 1 and Table 2, respectively.

For rank 4 (v=4), a UE is configured to report $SCI_l$ according to either Alt0-3 or Alt0-4 based on a condition (where the condition is one of Ex0-0 through Ex0-11), i.e., $SCI_l$ is a $\lceil \log_2 \min(K_0, 2L) \rceil$-bit indicator.

Here, $K_0 = \lceil \beta \times 2LM \rceil$, $$M = \left\lceil p \times \frac{N_3}{R} \right\rceil, \text{ and } M_l = \left\lceil v_0 \times \frac{N_3}{R} \right\rceil,$$

where $\beta$, p, $v_0$, and R is higher-layer configured parameters. In one example, parameter p is configured for rank 1-2 and parameter $v_0$ is configured for rank 3-4. In one example, $p \in \{1/4, 1/2\}$ and $v_0 \in \{1/4, 1/8\}$. In another example, $(p,v_0) \in \{(1/2,1/4), (1/4,1/4), (1/4,1/8)\}$. In another example, $(p,v_0) \in \{(1/2,1/4),(1/4,1/4)\}$. In another example, $(p,v_0) \in \{(1/2,1/4),(1/4,1/8)\}$.

In embodiment 4E, a UE is configured to report $SCI_l$ as follows.

For rank 1 (v=1), a UE is configured to report $SCI_l = SCI_0$ according to Alt0-0, i.e., $SCI_l$ is a $\lceil \log_2 K_{NZ,l} \rceil$-bit indicator.

For rank 2 (v=2), a UE is configured to report $SCI_l$ according to Alt0-3, i.e., $SCI_l$ is a $\lceil \log_2 K_0 \rceil$-bit indicator.

For rank 3 (v=3), a UE is configured to report $SCI_l$ according to either Alt0-3 or Alt0-5 based on a condition (where the condition is one of Ex0-18 through Ex0-25), i.e., $SCI_l$ is a $\lceil \log_2 \min(K_0, 2LM_l) \rceil$-bit indicator. The $SCI_l$ payload according to Ex0-24 and Ex0-25 are shown in Table 1 and Table 2, respectively.

For rank 4 (v=4), a UE is configured to report $SCI_l$ according to either Alt0-3 or Alt0-4 based on a condition (where the condition is one of Ex0-0 through Ex0-11), i.e., $SCI_l$ is a $\lceil \log_2 \min(K_0, 2L) \rceil$-bit indicator.

$K_0 = \lceil \beta \times 2LM \rceil$, $$M = \left\lceil p \times \frac{N_3}{R} \right\rceil, \text{ and } M_l = \left\lceil v_0 \times \frac{N_3}{R} \right\rceil,$$

where $\beta$, p, $v_0$, and R is higher-layer configured parameters. In one example, parameter p is configured for rank 1-2 and parameter $v_0$ is configured for rank 3-4. In one example, $p \in \{1/4, 1/2\}$ and $v_0 \in \{1/4, 1/8\}$. In another example, $(p,v_0) \in \{(1/2,1/4),(1/4,1/4),(1/4,1/8)\}$. In another example, $(p,v_0) \in \{(1/2,1/4),(1/4,1/4)\}$.

In embodiment 5, each PMI value, indicating the precoder or precoding matrix according the framework (5), corresponds to the codebook indices $i_1$ and $i_2$ where $$i_1 = \begin{cases} [i_{1,1} \; i_{1,2} \; i_{1,5} \; i_{1,6,1} \; i_{1,7,1} \; i_{1,8,1}] & v=1 \\ [i_{1,1} \; i_{1,2} \; i_{1,5} \; i_{1,6,1} \; i_{1,7,1} \; i_{1,8,1} \; i_{1,6,2} \; i_{1,7,2} \; i_{1,8,2}] & v=2 \\ [i_{1,1} \; i_{1,2} \; i_{1,5} \; i_{1,6,1} \; i_{1,7,1} \; i_{1,8,1} \; i_{1,6,2} \; i_{1,7,2} \; i_{1,8,2} \; i_{1,6,3} \; i_{1,7,3} \; i_{1,8,3}] & v=3 \\ [i_{1,1} \; i_{1,2} \; i_{1,5} \; i_{1,6,1} \; i_{1,7,1} \; i_{1,8,1} \; i_{1,6,2} \; i_{1,7,2} \; i_{1,8,2} \; i_{1,6,3} \; i_{1,7,3} \; i_{1,8,3} \; i_{1,6,4} \; i_{1,7,4} \; i_{1,8,4}] & v=4 \end{cases}$$

$$i_2 = \begin{cases} [i_{2,3,1} \; i_{2,4,1} \; i_{2,5,1}] & v=1 \\ [i_{2,3,1} \; i_{2,4,1} \; i_{2,5,1} \; i_{2,3,2} \; i_{2,4,2} \; i_{2,5,2}] & v=2 \\ [i_{2,3,1} \; i_{2,4,1} \; i_{2,5,1} \; i_{2,3,2} \; i_{2,4,2} \; i_{2,5,2} \; i_{2,3,3} \; i_{2,4,3} \; i_{2,5,3}] & v=3 \\ [i_{2,3,1} \; i_{2,4,1} \; i_{2,5,1} \; i_{2,3,2} \; i_{2,4,2} \; i_{2,5,2} \; i_{2,3,3} \; i_{2,4,3} \; i_{2,5,3} \; i_{2,3,4} \; i_{2,4,4} \; i_{2,5,4}] & v=4 \end{cases}$$

where:
- $i_{1,1}$ are the rotation factors for the SD basis (same as in Rel. 15 Type II CSI codebook)
- $i_{1,2}$ is the SD basis indicator (same as in Rel. 15 Type II CSI codebook)
- $i_{1,5}$ is the $M_{initial}$ indicator when $N_3 > 19$, indicating the intermediate FD basis set InS comprising 2M FD basis vectors
- $i_{1,6,l}$ is the FD basis indicator for layer l, indicating M FD basis vectors
- $i_{1,7,l}$ is the bitmap for layer l, indicating the location of non-zero (NZ) coefficients
- $i_{1,8,l}$ is the strongest coefficient indicator (SCI) for layer l, indicating location of the strongest coefficient=1
- $i_{2,3,l}$ are the reference amplitudes ($p_{l,r}^{(1)}$) for layer l, indicating the reference amplitude coefficient for the weaker polarization
- $i_{2,4,l}$ is the matrix of the differential amplitude values ($p_{l,i,m}^{(2)}$) for layer l
- $i_{2,5,l}$ is the matrix of the phase values ($\varphi_{l,i,m}$) for layer l.

In embodiment 6, a UE is configured to report $SCI_l$ for $l=1, 2, \ldots, v$, where v is the rank value (or number of layers) indicated by RI, according to Alt1-0B of this disclosure, which can be described in detail as follows.

The $SCI_l = i_{1,8,l}$ for $l=1, \ldots, v$, is given by:

Rank 1 (v=1): $SCI_l$ is a $\lceil \log_2 B \rceil$-bit indicator, where B is according to one of the following examples.

In one example, $B = K_{NZ} = K_{NZ,1} = \sum_{m=0}^{M-1} \sum_{i=0}^{2L-1} k_{1,i,m}^{(3)}$ is a total number of NZ coefficients (correspond to bit $k_{1,i,m}^{(3)} = 1$ in the bitmap for rank 1 case) reported by the UE via the bitmap. Hence, $SCI_1$ takes a value $SCI_1 = i_{1,8,l} = B - 1 = \sum_{m=0}^{M-1} \sum_{i=0}^{2L-1} k_{1,i,m}^{(3)} - 1$.

In another example, since $m_1^* = 0$ due to FD index remapping explained below $B = \sum_{i=0}^{i_1^*} k_{1,i,0}^{(3)}$ is a total number of NZ coefficients (correspond to bit $k_{1,i,m}^{(3)} = 1$ in the bitmap for rank 1 case) with the FD index $m_1^* = 0$. Hence, $SCI_1$ takes a value $SCI_1 = i_{1,8,l} = B - 1 = \sum_{i=0}^{i_1^*} k_{1,i,0}^{(3)} - 1$.

In another example, since $m_1^* = 0$ due to FD index remapping explained below $B = \sum_{i=0}^{2L-1} k_{1,i,0}^{(3)}$ is a total number of NZ coefficients (correspond to bit $k_{1,i,m}^{(3)} = 1$ in the bitmap for rank 1 case) with the FD index $m_1^* = 0$. Hence, $SCI_1$ takes a value $SCI_1 = i_{1,8,l} = B - 1 = \sum_{i=0}^{2L-1} k_{1,i,0}^{(3)} - 1$.

Rank >1 (e.g. $1 < v \le 4$): since $m_1^* = 0$ due to FD index remapping explained, $SCI_1$ is a $\lceil \log_2 2L \rceil$-bit indicator. Hence, $SCI_1$ takes a value $SCI_1 = i_{1,8,l} = i_l^*$ taking a value in $\{0, 1, \ldots, 2L-1\}$.

For layer l, the index $m_l$ of each non-zero (NZ) coefficient $c_{l,i_l,m_l}$ (i.e., differential amplitudes, phase value, and bitmaps) is remapped or mapped with respect to $m_l^*$ to $\tilde{m}_l$ such that the strongest coefficient index is remapped or mapped as $\tilde{m}_l^* = 0$. The FD basis indices $\{k_{m_l}\}$ associated with each NZ coefficient $c_{l,i_l,m_l}$ is remapped or mapped with respect to $k_{m_l}$ to $\tilde{k}_{m_l}$ such that the FD basis index of the strongest coefficient is remapped or mapped as $\tilde{k}_{m_l^*} = 0$.

Mathematically, the above is equivalent to the following. Let $m_l^* \in \{0, 1, \ldots, M-1\}$ be the index of $i_{2,4,l}$ and $i_l^* \in \{0, 1, \ldots, 2L-1\}$ be the index of $k_{l,i_l^*,m_l^*}^{(2)}$, which identify the differential amplitude values $p_{l,i_l^*,m_l^*}^{(2)}$ of the strongest coefficient of layer l, i.e., the element $k_{l,i_l^*,m_l^*}^{(2)}$ of $i_{2,4,l}$ which results in the largest value of the product $$p_{l,\lfloor \frac{i}{L} \rfloor}^{(1)} p_{l,i,m}^{(2)},$$

for $i=0, 1, \ldots, 2L-1$ and $m=0, 1, \ldots, M-1$. The indices of $i_{2,4,l}$, $i_{2,5,l}$ and $i_{1,7,l}$ (i.e., differential amplitudes, phase coefficients, and bitmaps) are indicated (after index remapping) with respect to $m_l^*$ as $\tilde{m}_l$ such that the strongest coefficient index is remapped or mapped as $\tilde{m}_l^* = 0$. In one example, this can be performed by $\tilde{m}_l = (m_l - m_l^*) \mod M$. The FD basis indices of $n_{3,l}^{(m_l)}$ are indicated (after index remapping) with respect to $k_{m_l^*} = n_{3,l}^{(m_l^*)}$ as $\tilde{k}_{m_l^*} = \tilde{n}_{3,l}^{(m_l)}$ such that the FD basis index of the strongest coefficient is remapped or mapped as $\tilde{k}_{m_l^*} = 0$. In one example, this can be performed by $\tilde{n}_{3,l}^{(m_l)} = (n_{3,l}^{(m_l)} - n_{3,l}^{(m_l^*)}) \mod N_3 = \tilde{k}_{m_l} = (k_{m_l} - k_{m_l^*}) \mod N_3$.

In embodiment 7, a UE is configured to report $M' \le M$ FD basis vectors according to at least one of the following alternatives.

In one alternative Alt 7-0: the UE reports M'=M or M'<M. When the UE reports M'<M, the M' value is a determined based on the value M, for example, $$M' = \frac{M}{2} \text{ or } \left\lceil \frac{M}{2} \right\rceil \text{ or } \left\lfloor \frac{M}{2} \right\rfloor.$$

In one example, $$M = \left\lceil p \times \frac{N_3}{R} \right\rceil,$$

where R is higher-layer configured from $\{1, 2\}$ and p is higher-layer configured from $\{¼, ½\}$.

In one alternative Alt 7-1: the UE reports p'=p or p'<p. When the UE reports p'<p, the p' value is a determined based on the value p, for example, p'=p/2 or p'=p+¼. In one example, the value p is higher-layer configured from $\{¼, ½\}$. The reported M and M' values are then given by $$M = \left\lceil p \times \frac{N_3}{R} \right\rceil \text{ and } M' = \left\lceil p' \times \frac{N_3}{R} \right\rceil,$$

respectively.

The (p,p') or (M,M') reporting can be explicit via a separate parameter in UCI part 1 of a two-part UCI. Alternatively, this reporting can be implicit (joint) together with another parameter in UCI part 1 of a two-part UCI (e.g. joint reporting together with $K_{NZ}$ reporting).

In one example, the p value is higher-layer configured for rank 1-2 CSI reporting. For rank >2 (e.g. rank 3-4), the p value (denoted by $v_0$) can be different. In one example, for rank 1-4, $(p, v_0)$ is jointly configured from $\{(½,¼), (¼,¼), (¼,⅛)\}$.

In embodiment 8, a UE is configured to report either M'=M or M'<M according to Alt 7-0 (or, either p'=p or p'<p according to Alt 7-1) only when at least one of the following conditions is met.

In one alternative Alt 8-0: Only when p=½ is higher-layer configured.

In one alternative Alt 8-1: Only when β=¼ is higher-layer configured.

In one alternative Alt 8-2: Only when p=½ and β=¼ are higher-layer configured.

In one alternative Alt 8-3: Only when p=½ or β=¼ is higher-layer configured.

In embodiment 8A, a UE is configured to report either M'=M or M'<M according to Alt 7-0 (or, either p'=p or p'<p according to Alt 7-1) only when the UE reports rank=1 and at least one of the conditions in Alt 8-0 through Alt 8-3 is met.

In embodiment 8B, a UE is configured to report either M'=M or M'<M according to Alt 7-0 (or, either p'=p or p'<p according to Alt 7-1) only when the UE reports rank=1 or 2 and at least one of the conditions in Alt 8-0 through Alt 8-3 is met.

In embodiment 8C, a UE is configured to report either M'=M or M'<M according to Alt 7-0 (or, either p'=p or p'<p according to Alt 7-1) only when the UE reports rank=1 or 2 or 3 and at least one of the conditions in Alt 8-0 through Alt 8-3 is met.

In embodiment 8D, a UE is configured to report either M'=M or M'<M according to Alt 7-0 (or, either p'=p or p'<p according to Alt 7-1) only when the UE reports rank=1 or 2 or 3 or 4 and at least one of the conditions in Alt 8-0 through Alt 8-3 is met.

In embodiment 8E, a UE is configured to report either M'=M or M'<M according to Alt 7-0 (or, either p'=p or p'<p according to Alt 7-1) only when L=2, the UE reports rank=1 and at least one of the conditions in Alt 8-0 through Alt 8-3 is met.

In embodiment 8F, a UE is configured to report either M'=M or M'<M according to Alt 7-0 (or, either p'=p or p'<p according to Alt 0-1) only when L=2, the UE reports rank=1 or 2 and at least one of the conditions in Alt 8-0 through Alt 8-3 is met.

In embodiment 8G, a UE is configured to report either M'=M or M'<M according to Alt 7-0 (or, either p'=p or p'<p according to Alt 7-1) only when L=2, the UE reports rank=1 or 2 or 3 and at least one of the conditions in Alt 8-0 through Alt 8-3 is met.

In embodiment 8H, a UE is configured to report either M'=M or M'<M according to Alt 7-0 (or, either p'=p or p'<p according to Alt 8-1) only when L=2, the UE reports rank=1 or 2 or 3 or 4 and at least one of the conditions in Alt 8-0 through Alt 8-3 is met.

In embodiment 8I, a UE is configured to report either M'=M or M'<M according to Alt 7-0 (or, either p'=p or p'<p according to Alt 7-1) only when L=2 or 4, the UE reports rank=1 and at least one of the conditions in Alt 8-0 through Alt 8-3 is met.

In embodiment 8J, a UE is configured to report either M'=M or M'<M according to Alt 7-0 (or, either p'=p or p'<p according to Alt 7-1) only when L=2 or 4, the UE reports rank=1 or 2 and at least one of the conditions in Alt 8-0 through Alt 8-3 is met.

In embodiment 8K, a UE is configured to report either M'=M or M'<M according to Alt 7-0 (or, either p'=p or p'<p according to Alt 7-1) only when L=2 or 4, the UE reports rank=1 or 2 or 3 and at least one of the conditions in Alt 8-0 through Alt 8-3 is met.

In embodiment 8L, a UE is configured to report either M'=M or M'<M according to Alt 7-0 (or, either p'=p or p'<p according to Alt 7-1) only when L=2 or 4, the UE reports rank=1 or 2 or 3 or 4 and at least one of the conditions in Alt 8-0 through Alt 8-3 is met.

Let $B=\lceil \log_2 A \rceil$ bits, where $A=K_0$ for rank 1 and $A=2K_0$ for rank >1 (e.g. rank 2-4). Note that A is the maximum number of NZ coefficients reported by the UE, i.e., A is the maximum value of $K_{NZ}$. Hence, B is the bit-width (number of bits) of the indicator, denoted by number of NZ coefficient indicator (NNZCI), indicating the value of $K_{NZ}$. Note that NNZCI is reported via UCI part 1 of the two-part UCI.

In embodiment 9, a UE is configured to report $K_{NZ}$ and M' jointly via parameter NNZCI in UCI part 1 of a two-part UCI. The $2^B$ states or values $\{0, 1, \ldots, 2^B-1\}$ that NNZCI can take are partitioned into two parts, $P_1$ and $P_2$.

The part $P_1$ comprises states or values $\{0, 1, \ldots, A-1\}$ indicating $K_{NZ} \in S = \{1, 2, \ldots, A\}$ and M'=M.

The part $P_2$ comprises states or values $\{A, A+1, \ldots, 2^B-1\}$ indicating $K_{NZ} \in S'$ and M'<M, where S' is a subset of S and comprises $2^B-A$ elements, i.e., the size of S' is $2^B-A$.

At least one of the following alternatives is used for S'.

In one alternative Alt 9-0: $S'=\{1, 2, \ldots, 2^B-A\}$.

In one alternative Alt 9-1: $=\{2A-2^B+1, 2A-2^B+2, \ldots, A-1, A\}$.

In one alternative Alt 9-2: $S'=\{1, 1+x, 1+2x, \ldots, 1+(2^B-A-1)x\}$.

In one alternative Alt 9-3: $S'=\{A-(2^B-A-1)x, A-(2^B-A-2)x, \ldots, A-x, A\}$.

In one alternative Alt 9-4: $S'=\{y, y+x, y+2x, \ldots, y+(2^B-A-1)x\}$.

In one alternative Alt 9-5: $=\{x, 2x, 3x, \ldots, (2^B-A)x\}$.

In one example, x is fixed, e.g., $$x = \left\lfloor \frac{A}{2^B - A} \right\rfloor \text{ or } x = \left\lceil \frac{A}{2^B - A} \right\rceil.$$

In one example, y is a fixed integer belonging to $\{1, 2, \ldots, x\}$.

In embodiment 10, a UE is configured to report $K_{NZ}$ and M' jointly via parameter NNZCI in UCI part 1 of a two-part UCI. The $2^B$ states or values $\{0, 1, \ldots, 2^B-1\}$ that NNZCI can take are partitioned into two equal parts, $P_1$ and $P_2$.

The part $P_1$ comprises states or values $\{0, 1, \ldots, 2^{B-1}-1\}$ indicating $K_{NZ} \in S_1$ and M'=M.

The part $P_2$ comprises states or values $\{2^{B-1}, 2^{B-1}+1, \ldots, 2^B-1\}$ indicating $K_{NZ} \in S_2$ and M'≤M.

Both $S_1$ are $S_2$ are subsets of $S=\{1, 2, \ldots, A\}$ and each comprises $2^{B-1}$ elements, i.e., the size of $S_1$ are $S_2$ is $2^{B-1}$.

In one sub-embodiment, $S_1=S_2$ and at least one of the following alternatives is used for $S_1=S_2$.

In one alternative Alt 10-0: $S_1=S_2=\{1, 2, \ldots, 2^{B-1}\}$.

In one alternative Alt 10-1: $S_1=S_2=\{A-2^{B-1}+1, A-2^{B-1}+2, \ldots, A-1, A\}$.

In one alternative Alt 10-2: $S_1=S_2=\{1, 1+x, 1+2x, \ldots, 1+(2^{B-1}-1)x\}$.

In one alternative Alt 10-3: $S_1=S_2=\{A-(2^{B-1}-1)x, A-(2^{B-1}-2)x, \ldots, A-x, A\}$.

In one alternative Alt 10-4: $S_1=S_2=\{y, y+x, y+2x, \ldots, y+(2^{B-1}-1)x\}$.

In one alternative Alt 10-5: $S_1=S_2=\{x, 2x, 3x, \ldots, (2^{B-1})x\}$.

In one example, x is fixed, e.g., $$x = \left\lfloor \frac{A}{2^{B-1}} \right\rfloor \text{ or } x = \left\lceil \frac{A}{2^{B-1}} \right\rceil.$$

In one example, y is a fixed integer belonging to $\{1, 2, \ldots, x\}$.

In one sub-embodiment, $S_1 \neq S_2$ and $S_1$ is according to Alt 10-$X_1$ and $S_2$ is according to Alt 10-$X_2$, where $X_1 \neq X_2$ and $X_1, X_2 \in \{0, 1, \ldots, 5\}$.

Figure 14:
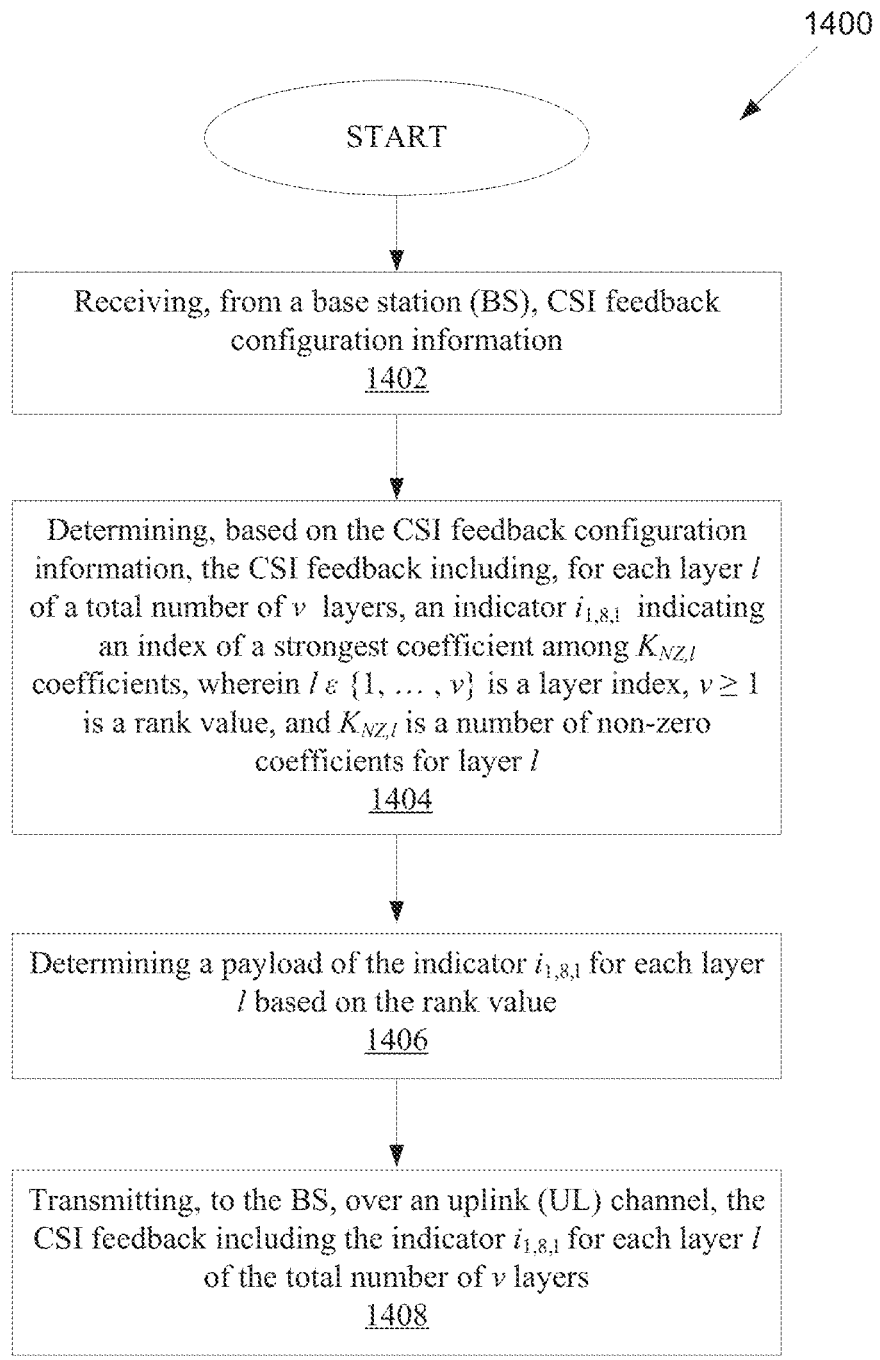
FIG. 14 illustrates a flow chart of a method for transmitting an UL transmission including CSI reporting, as may be performed by a UE according to embodiments of the present disclosure.

FIG. 14 illustrates a flow chart of a method 1400 for operating a user equipment (UE) for channel state information (CSI) reporting in a wireless communication system, as may be performed by a UE such as UE 116, according to embodiments of the present disclosure. The embodiment of the method 1400 illustrated in FIG. 14 is for illustration only. FIG. 13 does not limit the scope of this disclosure to any particular implementation.

As illustrated in FIG. 14, the method 1400 begins at step 1402. In step 1402, the UE (e.g., 111-116 as illustrated in FIG. 1) receives, from a base station (BS), channel state information (CSI) feedback configuration information.

In step 1404, the UE determines, based on the CSI feedback configuration information, the CSI feedback including, for each layer l of a total number of v layers, an indicator $i_{1,8,l}$ indicating an index of a strongest coefficient among $K_{NZ,l}$ coefficients, wherein $l \in \{1, \ldots, v\}$ is a layer index, $v \geq 1$ is a rank value, and $K_{NZ,l}$ is a number of non-zero coefficients for layer l.

In step 1406, the UE determines a payload of the indicator $i_{1,8,l}$ for each layer l based on the rank value.

In step 1408, the UE transmits, to the BS, over an uplink (UL) channel, the CSI feedback including the indicator $i_{1,8,l}$ for each layer l of the total number of v layers.

In one embodiment, for each layer l of the total number of v layers: a total of 2LM coefficients form a size 2L×M coefficient matrix $C_l$ comprising 2L rows and M columns, the $K_{NZ,l}$ coefficients correspond to non-zero coefficients of the coefficient matrix $C_l$, and the remaining 2LM $K_{NZ,l}$ coefficients of the coefficient matrix $C_l$ are zero; the index of the strongest coefficient comprises a row index $i_l^*$ and a column index $m_l^*$, where $i_l^* \in \{0, 1, \ldots, 2L-1\}$ and $m_l^* \in \{0, 1, \ldots, M-1\}$; and $i_{1,8,l}$ indicates the row index $i_l^*$ of the strongest coefficient.

In one embodiment, when the rank value v=1, the payload of the indicator $i_{1,8,l}$ is $\lceil \log_2 K_{NZ,l} \rceil$ bits, and $i_{1,8,l}$ is determined as $i_{1,8,l} = \Sigma_{i=0}^{i_1*} k_{1,i,0}^{(3)} - 1$, where $\lceil \cdot \rceil$ is a ceiling function, and $k_{1,i,0}^{(3)} = 1$ if the coefficient with a row index i and a column index m=0 is non-zero, and $k_{1,i,0}^{(3)} = 0$ otherwise.

In one embodiment, when the rank value $v \geq 1$, the payload of the indicator $i_{1,8,l}$ is $\lceil \log_2 (2L) \rceil$ bits, and $i_{1,8,l}$ is determined as $i_{1,8,l} = i_l^*$, where $\lceil \cdot \rceil$ is a ceiling function.

In one embodiment, for each layer l, the processor is configured to remap each column index $m_l$ of the coefficient matrix $C_l$ with respect to $m_l^*$ to a remapped index $\tilde{m}_l$ such that a remapped column index $\tilde{m}_l^*$ of the strongest coefficient is given by $\tilde{m}_l^* = 0$, where $m_l \in \{0, 1, \ldots, M-1\}$.

In one embodiment, the remapped index $\tilde{m}_l$ is determined as $\tilde{m}_l = (m_l - m_l^*) \bmod M$, where mod is a modulo function.

In one embodiment, for each layer l, the processor is configured to: determine basis indices $k_{m_l}$, where $m_l = 0, 1, \ldots, M-1$, of M basis vectors that are associated with M columns of the coefficient matrix $C_l$; determine a basis index $k_{m_l^*}$ associated with the column index $m_l^*$ of the strongest coefficient; and remap each basis index $k_{m_l}$ with respect to $k_{m_l^*}$ to a remapped basis index $\tilde{k}_{m_l}$ such that a remapped basis index $\tilde{k}_{m_l^*}$ associated with the strongest coefficient is given by $\tilde{k}_{m_l^*} = 0$.

In one embodiment, the remapped index $\tilde{k}_{m_l}$ is determined as $\tilde{k}_{m_l} = (k_{m_l} - k_{m_l^*}) \bmod N_3$, where $N_3$ is a total number of basis vectors and mod is a modulo function.

Figure 15:
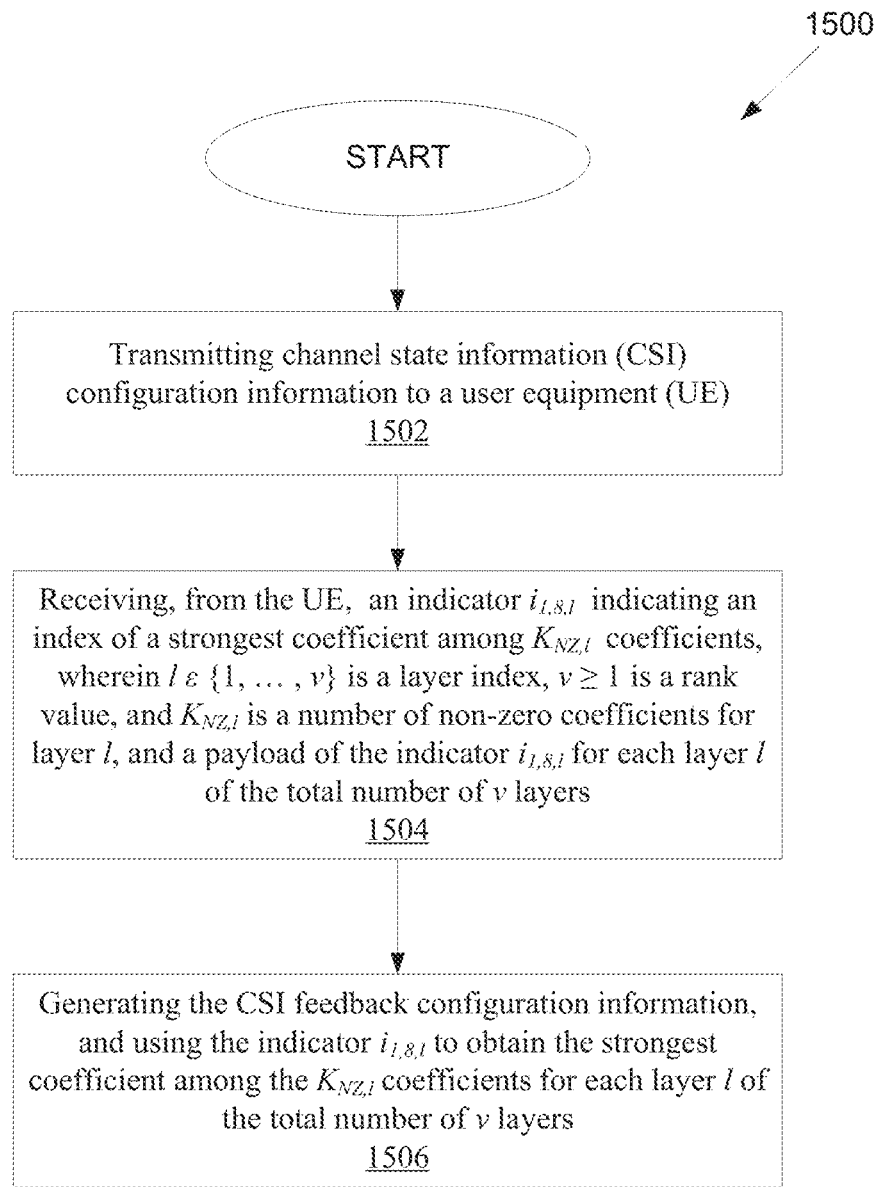
FIG. 15 illustrates a flow chart of another method for receiving an UL transmission including CSI reporting, as may be performed by a BS, according to embodiments of the present disclosure.

FIG. 15 illustrates a flow chart of another method 1500, as may be performed by a base station (BS) such as BS 102, according to embodiments of the present disclosure. The embodiment of the method 1500 illustrated in FIG. 15 is for illustration only. FIG. 15 does not limit the scope of this disclosure to any particular implementation.

As illustrated in FIG. 15, the method 1500 begins at step 1502. In step 1502, the BS (e.g., 101-103 as illustrated in FIG. 1), transmits channel state information (CSI) feedback configuration information to a user equipment (UE).

In step 1504, the BS receives, from the UE, CSI feedback including an indicator $i_{1,8,l}$ indicating an index of a strongest coefficient among $K_{NZ,l}$ coefficients for each layer l of a total number of v layers, wherein $l \in \{1, \ldots, v\}$ is a layer index, $v \geq 1$ is a rank value, $K_{NZ,l}$ is a number of non-zero coefficients for layer l, and a payload of the indicator $i_{1,8,l}$ for each layer l is based on the rank value.

In step 1506, the BS generates the CSI feedback configuration information, and uses the indicator $i_{1,8,l}$ to obtain the strongest coefficient among the $K_{NZ,l}$ coefficients for each layer l of the total number of v layers.

In one embodiment, for each layer l of the total number of v layers: a total of 2LM coefficients form a size 2L×M coefficient matrix $C_l$ comprising 2L rows and M columns, the $K_{NZ,l}$ coefficients correspond to non-zero coefficients of the coefficient matrix $C_l$, and the remaining 2LM $K_{NZ,l}$ coefficients of the coefficient matrix $C_l$ are zero; the index of the strongest coefficient comprises a row index $i_l^*$ and a column index $m_l^*$, where $i_l^* \in \{0, 1, \ldots, 2L-1\}$ and $m_l^* \in \{0, 1, \ldots, M-1\}$; and $i_{1,8,l}$ indicates the row index $i_l^*$ of the strongest coefficient.

In one embodiment, when the rank value v=1, the payload of the indicator $i_{1,8,l}$ is $\lceil \log_2 K_{NZ,l} \rceil$ bits, and $i_{1,8,l}$ is determined as $i_{1,8,l} = \Sigma_{i=0}^{i_1*} k_{1,i,0}^{(3)} - 1$, where $\lceil \cdot \rceil$ is a ceiling function, and $k_{1,i,0}^{(3)} = 1$ if the coefficient with a row index i and a column index m=0 is non-zero, and $k_{1,i,0}^{(3)} = 0$ otherwise.

In one embodiment, when the rank value $v \geq 1$, the payload of the indicator $i_{1,8,l}$ is $\lceil \log_2 (2L) \rceil$ bits, and $i_{1,8,l}$ is determined as $i_{1,8,l} = i_l^*$, where $\lceil \cdot \rceil$ is a ceiling function.

In one embodiment, for each layer l, each column index $m_l$ of the coefficient matrix $C_l$ is remapped with respect to $m_l^*$ to a remapped index $\tilde{m}_l$ such that a remapped column index $\tilde{m}_l^*$ of the strongest coefficient is given by $\tilde{m}_l^* = 0$, where $m_l \in \{0, 1, \ldots, M-1\}$.

In one embodiment, the remapped index $\tilde{m}_l$ is determined as $\tilde{m}_l = (m_l - m_l^*) \bmod M$, where mod is a modulo function.

In one embodiment, for each layer l: basis indices $k_{m_l}$, where $m_l = 0, 1, \ldots, M-1$, of M basis vectors are determined, where the M basis vectors are associated with M columns of the coefficient matrix $C_l$; a basis index $k_{m_l^*}$ associated with the column index $m_l^*$ of the strongest coefficient is determined; and each basis index $k_{m_l}$ is remapped with respect to $k_{m_l^*}$ to a remapped basis index $\tilde{k}_{m_l}$ such that a remapped basis index $\tilde{k}_{m_l^*}$ associated with the strongest coefficient is given by $\tilde{k}_{m_l^*} = 0$.

In one embodiment, the remapped index $\tilde{k}_{m_l}$ is determined as $\tilde{k}_{m_l} = (k_{m_l} - k_{m_l^*}) \bmod N_3$, where $N_3$ is a total number of basis vectors and mod is a modulo function.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) for channel state information (CSI) feedback in a wireless communication system, the UE comprising:

a transceiver configured to receive, from a base station (BS), CSI feedback configuration information; and
a processor operably connected to the transceiver, the processor configured to:
  determine, based on the CSI feedback configuration information, the CSI feedback including, for each layer l of a total number of v layers, a strongest coefficient indicator (SCI) for indicating an index of a strongest coefficient among $K_{NZ,l}$ coefficients, wherein $l \in \{1, \ldots, v\}$ is a layer index, $v \geq 1$ is a rank value, $SCI_l$ is the SCI for layer l, and $K_{NZ,l}$ is a number of non-zero coefficients for layer l; and
  determine a payload of the $SCI_l$ for each layer of the total number of v layers based on the rank value;
wherein the transceiver is configured to transmit, to the BS, over an uplink (UL) channel, the CSI feedback including the $SCI_l$ for each layer of the total number of v layers, and
wherein when the rank value v=1, the payload of the $SCI_l$ is $\lceil \log_2 K_{NZ,l} \rceil$ bits, and when the rank value v>1, the payload of the $SCI_l$ is $\lceil \log_e(2L) \rceil$ bits, where L is a number of first vectors.

2. The UE of claim 1, wherein when the rank value v=1, the $SCI_l$ corresponds to $i_{1,8,l} = \Sigma_{i=0}^{i_1^*} k_{1,i,0}^{(3)} - 1$, and $k_{1,i,0}^{(3)} = 1$ if a coefficient with an index i and an index m=0 is non-zero, and $k_{1,i,0}^{(3)} = 0$ otherwise.

3. The UE of claim 1, wherein when the rank value v>1, the $SCI_l$ corresponds to $i_{1,8,l} = i_l^*$, and $i_l^* \in \{0, 1, \ldots, 2L-1\}$.

4. The UE of claim 1, wherein, for each layer l, the processor is further configured to remap each index $m_l$ of the non-zero coefficients with respect to an index $m_l^*$ associated with the strongest coefficient using a modulo function such that the index $m_l^*$ is 0, where $m_l^* \in \{0, 1, \ldots, M-1\}$.

5. The UE of claim 1, wherein, for each layer l, the processor is further configured to remap each column index $k_{m_l}$ with respect to an index $k_{m_l^*}$ associated with the strongest coefficient using a modulo function such that the index $k_{m_l^*}$ is 0, where $m_l = 0, 1, \ldots, M-1$ of M second vectors.

6. The UE of claim 4, wherein the CSI feedback includes amplitude and phase coefficient indicators and a bitmap indicating locations of the non-zero coefficients after remapping.

7. The UE of claim 5, wherein the CSI feedback includes amplitude and phase coefficient indicators and a bitmap indicating locations of the non-zero coefficients after remapping.

8. A base station (BS), the BS comprising:
a transceiver configured to:
  transmit channel state information (CSI) feedback configuration information to a user equipment (UE); and
  receive, from the UE, CSI feedback including, for each layer l of a total number of v layers, a strongest coefficient indicator (SCI) for indicating an index of a strongest coefficient among $K_{NZ,l}$ coefficients, wherein $l \in \{1, \ldots, v\}$ is a layer index, $v \geq 1$ is a rank value, $SCI_l$ is the SCI for layer l, $K_{NZ,l}$ is a number of non-zero coefficients for layer l, and a payload of the SCI for each layer for each layer of the total number of v layers is based on the rank value; and
a processor operably coupled to the transceiver, the processor configured to:
  generate the CSI feedback configuration information; and
  obtain the strongest coefficient among the $K_{NZ,l}$ coefficients for each layer l of the total number of v layers based on the $SCI_l$ for each layer of the total number of v layers, wherein when the rank value v=1, the payload of the $SCI_l$ is $\lceil \log_2 K_{NZ,1} \rceil$ bits, and when the rank value v>1, the payload of the $SCI_l$ is $\lceil \log_2(2L) \rceil$ bits, where L is a number of first vectors.

9. The BS of claim 8, wherein when the rank value v=1, the $SCI_l$ corresponds to $i_{1,8,l} = \Sigma_{i=0}^{i_1^*} k_{1,i,0}^{(3)} - 1$, and $k_{1,i,0}^{(3)} = 1$ if a coefficient with an index i and an index m=0 is non-zero, and $k_{1,i,0}^{(3)} = 0$ otherwise.

10. The BS of claim 8, wherein when the rank value v>1, the $SCI_l$ corresponds to $i_{1,8,l} = i_l^*$, and $i_l^* \in \{0, 1, \ldots, 2L-1\}$.

11. The BS of claim 8, wherein, for each layer l, each index $m_l$ of the non-zero coefficients is remapped with respect to an index $m_l^*$ associated with the strongest coefficient using a modulo function such that the index $m_l^*$ is 0, where $m_l^* \in \{0, 1, \ldots, M-1\}$.

12. The BS of claim 8, wherein, for each layer l, each index $k_{m_l}$ is remapped with respect to an index $k_{m_l^*}$ associated with the strongest coefficient using a modulo function such that the index $k_{m_l^*}$ is 0, where $m_l = 0, 1, \ldots, M-1$ of M second vectors.

13. The BS of claim 11, wherein the CSI feedback includes amplitude and phase coefficient indicators and a bitmap indicating locations of the non-zero coefficients after remapping.

14. The BS of claim 12, wherein the CSI feedback includes amplitude and phase coefficient indicators and a bitmap indicating locations of the non-zero coefficients after remapping.

15. A method for operating a user equipment (UE), the method comprising:
receiving, from a base station (BS), CSI feedback configuration information;
determining, based on the CSI feedback configuration information, CSI feedback including, for each layer/of a total number of v layers, a strongest coefficient indicator (SCI) for indicating an index of a strongest coefficient among $K_{NZ,l}$ coefficients, wherein $l \in \{1, \ldots, v\}$ is a layer index, $v \geq 1$ is a rank value, $SCI_l$ is the SCI for layer l, and $K_{NZ,l}$ is a number of non-zero coefficients for layer l;
determining a payload of the $SCI_l$ for each layer of the total number of v layers based on the rank value; and
transmitting, to the BS, over an uplink (UL) channel, the CSI feedback including the $SCI_l$ for each layer of the total number of v layers,
wherein when the rank value v=1, the payload of the $SCI_l$ is $\lceil \log_2 K_{NZ,1} \rceil$ bits, and when the rank value v>1, the payload of the $SCI_l$ is $\lceil \log_2(2L) \rceil$ bits, where L is a number of first vectors.

16. The method of claim 15, further comprising:
for each layer l, remapping each index $m_l$ of the non-zero coefficients with respect to an index $m_l^*$ associated with the strongest coefficient using a modulo function such that the index $m_l^*$ is 0, where $m_l^* \in \{0, 1, \ldots, M-1\}$.

17. The method of claim 15, further comprising, for each layer l, remapping each column index $k_{m_l}$ with respect to an index $k_{m_l^*}$ associated with the strongest coefficient using a modulo function such that the index $k_{m_l^*}$ is 0, where $m_l = 0, 1, \ldots, M-1$ of M second vectors.

18. The method of claim 15, wherein:
when the rank value v=1, the $SCI_l$ corresponds to $i_{1,8,l} = \Sigma_{i=0}^{i_1^*} k_{1,i,0}^{(3)} - 1$, and $k_{1,i,0}^{(3)} = 1$ if a coefficient with an index i and an index m=0 is non-zero, and $k_{1,i,0}^{(3)} = 0$ otherwise, and
when the rank value v>1, the $SCI_l$ corresponds to $i_{1,8,l} = i_l^*$, and $i_l^* \in \{0, 1, \ldots, 2L-1\}$.

19. The method of claim 16, wherein the CSI feedback includes amplitude and phase coefficient indicators and a bitmap indicating locations of the non-zero coefficients after remapping.

20. The method of claim 17, wherein the CSI feedback includes amplitude and phase coefficient indicators and a bitmap indicating locations of the non-zero coefficients after remapping.

* * * * *